US012634287B2

(12) United States Patent
Jones et al.

(10) Patent No.: US 12,634,287 B2
(45) Date of Patent: May 19, 2026

(54) SYSTEMS AND METHODS FOR DYNAMIC ACCESS CONTROL FOR SECURE SYSTEMS BASED ON USER TUNING SUBJECT TO SYSTEM CONTROLS

(71) Applicant: Capital One Services, LLC, McLean, VA (US)

(72) Inventors: Garrett Jones, McLean, VA (US); Elise Rivas, McLean, VA (US); Pramod Poojary, McLean, VA (US); Lakshmi Narasimha Sarma Kattamuri, Herndon, VA (US); Chandrasekar Thirunavukkarasu, Chicago, IL (US); Sowmyanarayanan Govindan, McLean, VA (US); Charlie Size, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 192 days.

(21) Appl. No.: 18/462,118

(22) Filed: Sep. 6, 2023

(65) Prior Publication Data

US 2025/0080539 A1 Mar. 6, 2025

(51) Int. Cl.
*H04L 9/40* (2022.01)
(52) U.S. Cl.
CPC ................................. *H04L 63/102* (2013.01)
(58) Field of Classification Search
CPC ...................................................... H04L 63/102
See application file for complete search history.

(56) References Cited

U.S. PATENT DOCUMENTS

| | | | | |
|---|---|---|---|---|
| 8,769,102 B1* | 7/2014 | Zhou | ................... | G06F 11/3696 |
| | | | | 709/225 |
| 11,252,190 B1* | 2/2022 | Sharifi Mehr | .......... | H04L 63/10 |
| 11,373,236 B1* | 6/2022 | Reed | ...................... | G06Q 40/03 |
| 12,166,827 B1* | 12/2024 | Srikantan | ............ | H04L 12/4641 |
| 2012/0331526 A1* | 12/2012 | Caudle | ................ | G06F 21/6209 |
| | | | | 726/4 |
| 2013/0212270 A1* | 8/2013 | Hsieh | ....................... | H04L 67/62 |
| | | | | 709/225 |
| 2017/0163631 A1* | 6/2017 | Brucker | ................ | H04L 63/101 |
| 2018/0091521 A1* | 3/2018 | Pachouri | ................. | G06F 21/45 |
| 2020/0170020 A1* | 5/2020 | Agiwal | ................. | H04L 5/0055 |
| 2020/0259839 A1* | 8/2020 | Huebner | ............... | H04L 63/102 |
| 2021/0014233 A1* | 1/2021 | Kuppannan | ......... | H04L 63/0209 |
| 2021/0314156 A1* | 10/2021 | Liu | ........................ | H04L 9/0861 |
| 2021/0319133 A1* | 10/2021 | Teich | ................... | H04L 63/0407 |
| 2023/0199027 A1* | 6/2023 | Castinado | ............... | H04L 41/22 |
| | | | | 726/4 |
| 2023/0229420 A1* | 7/2023 | Paravatha | ................. | G06F 8/65 |
| | | | | 717/169 |
| 2023/0254902 A1* | 8/2023 | Mu | ..................... | H04W 74/006 |
| | | | | 370/329 |

(Continued)

*Primary Examiner* — Jason Chiang
(74) *Attorney, Agent, or Firm* — Foley & Lardner LLP

(57) ABSTRACT

Systems and methods for dynamically mediating user access to resources based on user and administrator system input. In some aspects, the system may receive a first resource access request. The system may transmit a request for configuration criteria. The system may receive a plurality of configuration parameter sets. The system may determine a first access configuration. The system may provide access to the first resource according to the first access configuration.

20 Claims, 7 Drawing Sheets

500

(56)                    References Cited

U.S. PATENT DOCUMENTS

| | | | |
|---|---|---|---|
| 2023/0319333 A1* | 10/2023 | Rivoalen ............ | H04N 21/2187 |
| | | | 725/116 |
| 2023/0362170 A1* | 11/2023 | Song ................... | H04L 63/0876 |
| 2023/0418477 A1* | 12/2023 | Muthiah ............... | G06F 3/0658 |
| 2024/0005318 A1* | 1/2024 | Dolezal ................ | G06Q 20/401 |
| 2024/0356919 A1* | 10/2024 | Muralidhar ......... | H04L 63/0884 |
| 2024/0406175 A1* | 12/2024 | Boucadair ........... | H04L 41/5009 |
| 2025/0007915 A1* | 1/2025 | Boucadair ........... | H04L 61/4511 |
| 2025/0039938 A1* | 1/2025 | Wu ..................... | H04W 74/006 |
| 2025/0080476 A1* | 3/2025 | Cannizzaro .......... | H04L 47/808 |
| 2025/0080536 A1* | 3/2025 | Jones ................... | G06F 9/5011 |

* cited by examiner

100

| Resource Access Request 102 | |
|---|---|
| Entity Identifier | gadesai |
| Resource Size | 2048 MB |
| Bandwidth | 23 GB/sec |
| Resource Type | Text File |
| Timestamp | 2023-06-23T1733Z |

104 — Entity Identifier
106 — Resource Size
108 — Resource Type
110 — Timestamp

| Entity Identifier 122 | gadesai |
|---|---|

| Resource Access Database | | | |
|---|---|---|---|
| Resource Identifier 124 | Resource Size 126 | Resource Type 128 | Timestamp 130 |
| 2349024 | 3.5 TB | Executable File | 2022-12-21T1733Z |
| 5729193 | 234 GB | Executable File | 2023-01-04T0821Z |
| 5910384 | 2 MB | Text File | 2023-02-05T0403Z |
| 5910384 | 2 MB | Text File | 2023-05-20T0402Z |
| 9746391 | 204 MB | Image File | 2023-06-04T1923Z |
| 0132841 | 5.5 TB | Executable File | 2023-06-23T2052Z |
| Sum 132 | 9.2 TB | | |

| Grouping Identifier | 2395208 | |
|---|---|---|
| Grouping Parameter Set | | |
| Identifiers of Resources in Grouping 142 | | |
| 2349024 | 94203342 | 0132841 | 9059321 |
| Sum of Resource Sizes 144 | | 50324 TB |
| Resource Type 146 | | Executable Files |
| Time Period of Timestamps 148 | | May 2023 |

FIG. 1C

| Access Configuration Identifier 164 | 5B | | |
|---|---|---|---|
| Configuration Parameter Set 162 | | Configuration Specification 166 | |
| Parameter 168 | Parameter Value 170 | Upper Bound 172 | Lower Bound 174 |
| Maximum Bandwidth | 50 GB/sec | 30 GB/sec | 70 GB/sec |
| Access Duration | 3 years | 2 years | 4 years |
| Monthly Cost | $400/month of access | $300/month | $200/month |
| Payments Per Year | 12 payments/year | 10 payments/ year | 15 payments/ year |
| Identifiers of Accessible Resources | 7028104 | | |
| | 0329832 | | |
| | 0529341 | | |

502 — Receive a first resource access request

504 — Transmit a request for configuration criteria

506 — Receive a plurality of configuration parameter sets

508 — Determine a first access configuration

510 — Provide access to the first resource according to the first access configuration

SYSTEMS AND METHODS FOR DYNAMIC ACCESS CONTROL FOR SECURE SYSTEMS BASED ON USER TUNING SUBJECT TO SYSTEM CONTROLS

SUMMARY

The security of systems, such as computer networks, greatly benefits from strong user authentication and access protocols. A computer system, such as a data storage system or a high-performance computing (HPC) system, may possess an interface that enables users to request access to digital resources while protecting the benefiting system and providing for its safety and efficiency.

However, conventional systems may struggle to balance security considerations with user preferences for access to resources. For example, in conventional systems, a user may submit credential information (e.g., to apply for access to a subsystem within a cloud storage server). Based on these credentials, the system may allow or deny the user access to the requested services. However, in such conventional systems, users may be presented with few resource access options. For example, a user may be presented with only one set of protocols for how to access the electronic resource, including access rules, storage restrictions, or access times. As such, conventional systems offer limited user-specific access to resources, providing all users with access to a particular electronic resource or storage subsystem with the same access parameters or restrictions. As an illustrative example, a first user who anticipates uploading large files infrequently may require a larger bandwidth but more infrequent access to a storage system than a second user who anticipates uploading multiple small files more often. As such, conventional systems are unable to modify access to electronic resources adaptively for the intended user.

Furthermore, conventional systems may provide access to system resources (e.g., subsystems within a cloud storage system) on a case-by-case basis. For example, conventional systems may require users to submit distinct requests for accessing different system resources. However, some resource requests may be similar or associated with each other, such as requests for the same electronic resources (e.g., requests for access to similar architectures of nodes within cloud storage systems). As such, conventional systems (e.g., cloud storage systems) may be slow or inefficient at handling requests for further resources.

Methods and systems are described herein for providing personalized access to resources according to user preference while still subject to administrator controls. For example, the system enables handling of requests for cloud computing resources, such as access to file systems or file storage, through classification of requests for resources into associated groups according to user preference (e.g., based on resource type or values associated with resources) while enabling a system administrator to impose limits on which access configurations are available to the user. Such access configurations may include specifications of maximum bandwidths, access duration, or other access-related limitations for the user. Thus, the system may enable access to cloud computing-based resources on the basis of user's choice of a configuration with which to access the grouping of resources based on choices provided by the administrator system.

In some embodiments, the system enables users to control how resources are grouped and which resources are allocated. For example, the system may provide users control over how resources are allocated under different configurations for accessing such resources. As an illustrative example, the system may dynamically sort requested electronic resources into groups, each of which may be accessible using a different set of parameters. For example, the system may group similar resources requested by a given user together in order to prevent the need for case-by-case resource allocation. As an illustrative example, if the user requests access to multiple file systems of a similar type and storage size (e.g., a new technology file system (NTFS) with around 40 GB per file system requested), the system may group such resources together and evaluate these requests as a group. Based on a characterization of these groupings of requested resources, the system may query the system administrator for a set of access configurations for which a user may be eligible. The system enables a user to select a preferred access configuration based on these eligible access configurations, thereby enabling user control over how resources are grouped. Furthermore, by grouping the requested resources, characterizing these groupings, and providing the user options for how to access these grouped resources, the system enables efficient processing of requests for computing resources without case-by-case handling, thereby improving system efficiency and user experience.

In some aspects, the system may receive a resource access request. For example, the system may receive a resource access request from a first entity (e.g., a user), where the resource access request includes a first resource parameter set corresponding to a first resource requested by the first entity. As an illustrative example, a user of a cloud storage system may request access to a particular file system with a specification of the storage size requested, file system standard, and/or other parameters associated with the request for computational resources. By receiving such information, the system obtains information to assist in determining whether and how to provide access to the requested resources to the user.

In some aspects, the system may retrieve a plurality of resource groupings. For example, each resource grouping of the plurality of resource groupings may include a corresponding grouping class and a corresponding grouping parameter set. As an illustrative example, the system may categorize previously requested resources into groups based on a class or a type of the grouping. For example, the grouping class may include an indication of the type of resources requested for the given grouping. The system may characterize the group based on parameters associated with the associated resources. For example, the system may determine a grouping of requests of NTFS file space for image storage from the user; the system may characterize the grouping using grouping parameters, such as a total storage size requested and/or a bandwidth requested for uploads and downloads to the file system. By characterizing such groupings, the system enables administrators to consider various requests in tandem, thereby reducing the need for case-by-case resource allocations and improving system efficiency accordingly.

In some aspects, the system may determine a first grouping of the plurality of resource groupings. For example, the system may determine a first grouping of the plurality of resource groupings for the first resource based on the first resource parameter set, wherein the first grouping is associated with a first grouping parameter set. As an illustrative example, the system may identify a resource type associated with the resource request, such as that the request is associated with image storage within the cloud storage system. The system may determine preexisting resource groupings associated with this resource type, such as a grouping of previous image storage requests. By doing so, the system may group similar requests for resources, thereby improving the efficiency of granting resource access requests.

In some aspects, the system may obtain a set of access configurations. For example, the system may obtain, from a second entity, a set of access configurations based on the first grouping parameter set. Each access configuration of the set of access configurations may be associated with an associated configuration parameter set. Each configuration parameter set may indicate a protocol for an associated access configuration. A corresponding configuration parameter of the associated configuration parameter set may match a corresponding resource parameter of the first grouping parameter set. As an illustrative example, the system may receive multiple sets of parameters from a system administrator, where each set of parameters indicates a way the user may be able to access the requested group of resources. For example, such parameters may include maximum bandwidths for uploading or downloading to the cloud storage system or durations of permitted access for the user. The second entity (e.g., the system administrator) may determine which of these sets of parameters associated with different access configurations may be suitable given the grouping parameter set associated with the requested resource. The system administrator may, for example, consider a user's previous activity on the system (e.g., previous uploads, downloads, or use of resources) in order to determine a user's eligibility for a particular access configuration. Based on these determinations, the entity may confirm a set of access configurations that may be chosen by the user to access the requested file system for image storage. By doing so, the system provides user personalization and choice based on the nature of the requested resources; furthermore, because such requested resources are grouped, the system improves the efficiency of handling requests for resources beyond case-by-case consideration.

In some aspects, the system may receive a requested access configuration from the user. For example, the system may receive, from the first entity, a requested access configuration of the set of access configurations for accessing the first resource. As an illustrative example, the system may transmit the set of access configurations received from a system administrator that satisfy the user's requested resource. Based on this set of access configurations, the user may select a requested access configuration according to their preference. The selected access configuration may include indications of how the resources may be accessed, such as bandwidth restrictions, access duration, or an allowed frequency of access to the given file system. Because the user may have multiple options for these parameters based on the set of access configurations presented by the administrator system, the system enables the user to select a preferred option out of these sets of parameters, thereby enabling user flexibility and choice and improving the user experience of accessing the cloud computing system.

In some aspects, the system may provide access to the first resource (e.g., according to the user's selection). For example, the system may provide access to the first resource for the first entity according to the requested access configuration and the associated configuration parameter set. As an illustrative example, the system may receive a selection of an access configuration from the user, where this selection indicates parameters associated with how the user would like to access the resource (e.g., including a throttling bandwidth, access duration, and frequency of uploads/ downloads to the file system). The system may allow access to the requested cloud storage resources according to these requested parameters. As such, the system considers both a system administrator's requirements, as well as a user's preference, in determining how to provide a user access to resources. Furthermore, the system accomplishes the provision of these resources by grouping such resources together, thereby improving the efficiency of the provision of these resources. By doing so, the system improves the flexibility, efficiency, and user experience of the system.

In some embodiments, the system enables users to control parameters associated with accessing resources, such as bandwidth for file transfers, access duration, and accessible resources, as well as how electronic resources are grouped. Furthermore, the system enables administrator control over options available to the user, including the ability to set restrictions on parameters associated with accessing the cloud storage system. Based on characterizing the requested resources, the system may evaluate the user to determine a set of parameters for accessing the resource that may be tuned or modified by the user. For example, a system administrator may specify restrictions for how the user may modify the set of parameters and provide modification options for the user accordingly. Such parameters may include resource access-related values, such as a maximum bandwidth for uploads or downloads to a file system within the cloud storage system or a duration of access to the resources. In some embodiments, the user may specify how to automatically provide access to further requested resources with a given access configuration, such as by specifying a resource type associated with an access configuration. As such, the system enables user control over how grouping occurs, as well as how the given group is provided access to the resources. However, system administrators may limit how much control users may have over these access options and resource groupings. As an illustrative example, the system enables a user to determine which set of parameters (e.g., which access configuration) to use for further requests for resources, such as file systems within a cloud storage system, depending on the nature of the requested resources (e.g., a total file storage size or file storage type requested). The system may allow access to these resources according to access parameters agreed to by both the administrator system and the user. By doing so, the system enables more efficient handling of resource access requests by the system as compared to conventional systems while providing personalization of how these resources are provided to the user based on the user's preferences.

In some aspects, the system may receive a first resource access request. For example, the system may receive a first resource access request from a device associated with a first entity (e.g., a user), the first resource access request including a first resource parameter set corresponding to a first resource. As an illustrative example, the system may receive a request from a user for access to a particular file system within a cloud storage system for a particular purpose (e.g., for image storage). The request may include a set of parameters associated with the request, such as an indication of a requested storage size, the type of file system, or a requested bandwidth for uploading or downloading. By receiving such information relating to the request, the system obtains enough information to determine whether and how to provide the resources to the requesting user, thereby improving the security of the cloud storage system.

In some aspects, the system may transmit a request for configuration criteria to a first system. For example, the configuration criteria may include a set of specifications, where each specification of the set of specifications is associated with a corresponding configuration parameter set for a corresponding access configuration of a set of access configurations. The corresponding access configuration parameter set may control access to resources based on the corresponding access configuration. As an illustrative example, the system may request information from a system administrator requesting possible access configurations that define parameters for how a user may access requested resources; furthermore, the system may define a set of configuration criteria (e.g., based on the nature of the user request or the user themselves) that define the control a user may have in tuning or modifying the parameters of each access configuration. For example, the system may request information relating to the resource types that are compatible with each access configuration, as well as the total file storage size that is allowed to be accessed for each of these access configurations. Furthermore, the system may request information relating to values to which these parameters may be modified by the user, thereby requesting information relating to the flexibility a given user may have in tuning these access configurations according to personal preference or requirements. Based on this request, the system may receive the corresponding configuration criteria as determined by the system administrator, for example, for further modification or tuning by the user. For example, the configuration criteria may include ranges of acceptable values for parameters, such as acceptable values for access duration or bandwidth throttling maximums. By specifying such values, the administrator may relay available access options to the system, as well as the degree to which these access options may be tuned by the user, thereby improving system flexibility while maintaining administrator control of the system.

In some aspects, the system may receive a plurality of configuration parameter sets. For example, the system may receive, from the device associated with the first entity (e.g., the user), a plurality of configuration parameter sets, wherein a respective configuration parameter set of the plurality of configuration parameter sets satisfies a respective specification of the configuration criteria. As an illustrative example, the system may receive a set of configuration parameters corresponding to access configurations selected by the user. For example, these configurations may include access protocols for accessing cloud storage space that are selected by the user for handling further requests for resource access. Furthermore, these parameters may include information that is consistent with the administrator-defined configuration criteria, specifying the user's preference of access parameters as limited by the corresponding specifications of the configuration criteria. By receiving indications of multiple access configurations preferred by the user, the system enables the user to define how various types of resources that are requested are handled by the system while maintaining access to these resources within the bounds specified by the administrator (e.g., as defined in the configuration criteria).

In some aspects, the system may determine a first access configuration of the set of access configurations. For example, the system may determine a first access configuration of the set of access configurations, where parameters of the first resource parameter set are consistent with the first access configuration. As an illustrative example, the system may determine that an access configuration of the set of access configurations is for storage of image files below a certain storage size, consistent with the requested filesystem type (e.g., NTFS); thus, the system may determine the first access configuration based on its match with the requested resource by the first entity (e.g., the user). By doing so, the system enables resources requested by the user to be handled automatically according to access configurations chosen and tuned by the user, thereby enabling automatic handling of requests for further resources. However, these chosen access configurations are associated with parameters that are limited or bounded by the administrator system, thereby enabling administrator control over how the user determines to specify resource access preferences. As such, the disclosed system enables user flexibility while maintaining system security.

In some embodiments, the system may provide access to the first resource for the user according to the user's determined protocol. For example, the system may provide, to the device, access to the first resource according to the first access configuration. As an illustrative example, the system may determine that the first resource requested by the user corresponds to the first access configuration and provide access to the resource according to the parameters specified within that corresponding configuration parameter set. The system may, for example, throttle the bandwidth according to a maximum bandwidth parameter for the user's access to the cloud storage system file system and/or provide access to the system for a specified access duration. By doing so, the system may provide access to requested resources according to both administrator controls and user preference, thereby improving user experience while simultaneously maintaining security and controls on the system as required by the administrator.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 1A shows a schematic of a data structure representing a resource access request from a user, in accordance with one or more embodiments.

FIG. 1B shows a schematic of a data structure representing a resource access database corresponding to the user, in accordance with one or more embodiments.

FIG. 1C shows a schematic for a data structure representing a grouping parameter set for a grouping of requested resources, in accordance with one or more embodiments.

FIG. 1D shows a schematic for a data structure representing a configuration parameter set and a corresponding configuration specification for an access configuration, in accordance with one or more embodiments.

DETAILED DESCRIPTION

Figure 2:
FIG. 2 shows an illustrative display of resource access instructions for a user on a user interface, in accordance with one or more embodiments.

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

FIG. 1A shows a schematic of data structure 100 representing a resource access request from a user, in accordance with one or more embodiments. For example, data structure 100 represents resource access request 102, which includes information relating to a requesting entity, such as entity identifier 104. Resource access request 102 may include information relating to the resources requested, such as resource size 106, a bandwidth for uploads and downloads, resource type 108, or timestamp 110 describing a time for the request. By including information relating to resources requested by the user, the system may evaluate the user's request for resources and provide these resources according to this evaluation, thereby improving the security of the system by mitigating access to the system by unfavorable entities.

In disclosed embodiments, a resource access request may include a request for access to one or more resources by an entity. A resource may include digital or electronic resources, such as a file system or an allotment of storage within a cloud storage system. A digital resource may include access to nodes (or processing time on such nodes), computing systems, or other devices. In some embodiments, a resource may include financial resources, such as loans, lines of credit, or access to particular bank accounts. For example, a resource access request may include a credit card application, a loan application, or requests for lines of credit related to particular purchases. As an illustrative example, an entity (e.g., a user or a customer) may request a line of credit to cover one or more purchases, such as a buy now, pay later (BNPL) loan; thus, a resource access request may include information relating to one or more transactions. By receiving resource access requests, the system may evaluate whether to provide the requesting entity with the requested resource, thereby protecting the system from provision of resources to entities unable to or unwilling to adhere to any restrictions or rules for resource access. For example, the system may prevent those with poor evaluation metrics (e.g., credit scores) from access to lines of credit where these entities may have a poor likelihood of paying back the line of credit according to specified rules (e.g., a specified payment plan). Additionally or alternatively, the system may provide access to such resources according to the specified configuration parameters. For example, the system (e.g., through a card issuer) may provide access to a loan (e.g., a BNPL loan) with a particular loan term and interest rate by approving the loan for a given customer and subsequently settling a transaction associated with the merchant directly, while requiring repayment on behalf of the customer.

For example, in some embodiments, a resource may include a loan of a type (e.g., a class, profile, or set of parameters, such as interest rates, associated with a loan) defined by a merchant or card-issuer that is based on one or more previous payments, such as previous loan installment payments by a customer. A resource may include a loan type defined by a merchant or card-issuer based on how previous payment-related behavior associated with a customer (e.g., within a period of 12 months). For example, a loan's parameters may include short terms (e.g., one month, three months, six months, etc.) for customer spending that is likely to be paid off quickly, while another loan's parameters may include longer terms (e.g., one year, two years, five years, etc.) for customer spending that is likely to be paid off more slowly, according to customer behavior. A resource may include a loan type defined by a merchant or card-issuer based on a size or complexity of a customer's spending within a determined time period (e.g., the most recent month or payment period). For example, the loan may include parameters set on the basis of grouping or bundling transactions of the same type and corresponding transaction values into a single loan value.

In some embodiments, a resource may include a loan of a type (e.g., a class, profile, or set of parameters, such as interest rates, associated with a loan) defined by a customer that is based on spending ranges within a pay period. For example, the customer may determine ranges of spending within the pay period, where each range of spending corresponds to loans of different types. A resource may include a loan of a type defined by a customer based on types of transactions associated with the loan. For example, the resource may include a loan that has a longer term (or a different interest rate) for a certain type of purchases as compared to a loan corresponding to a different type of purchases. In some embodiments, the aforementioned examples may be implemented as one loan per payment period (e.g., statement) or multiple loans per statement, where each loan has a different set of parameters.

In some embodiments, resources may be associated with resource parameters (e.g., a resource parameter set). A resource parameter may include any characterization or metric for a resource. For example, a resource parameter may include one or more resource types associated with the requested resource (e.g., a text file requested by the user), one or more resource values (e.g., a size associated with the text file), and/or parameters associated with access to the resource (e.g., a maximum bandwidth for uploads or downloads of the requested text file). For example, resource types may indicate types of digital resources, such as a classification of a type of file, file system, or device being requested. In some embodiments, a resource type may include a type of transaction or payment for which a line of credit (e.g., BNPL loan) is requested. A resource type may include, for example, a classification of a transaction into a luxury purchase, a grocery purchase, or a travel purchase. Resource values may include information relating to quantitative measures of a resource. For example, a resource value may indicate a file size, a storage size, or a processing speed associated with a device or memory requested by a user. In some embodiments, a resource value may include an indication of a transaction size or purchase for which a line of credit is being requested. For example, the resource value may include a dollar amount of a purchased good. In some embodiments, the resource access request may include a parameter that includes a timestamp (e.g., timestamp 110)

corresponding to a time of the resource access request. By including such parameters that characterize the nature of requested resources, the system may better evaluate the nature of the user's request and, as such, make a decision as to how or whether to provide the user with the requested resource.

The resource access request may be submitted from an entity and may request resources of another entity. An entity may include users, administrators, or systems associated with the provision or receipt of resources. For example, an entity may include a prospective user of a cloud storage system or an HPC system requesting electronic resources. Additionally or alternatively, an entity may include a customer making a purchase or transaction at a merchant and requesting a line of credit for this purchase (e.g., a BNPL loan). In some embodiments, an entity may include an administrator or policy-setter of any of these systems, including a system administrator of an HPC or cloud storage system, a merchant, and/or a lender corresponding to the line of credit. Such entities may be associated with entity identifiers (e.g., user identifiers). For example, entity identifier 104 may identify the party making the resource access request, including a username, a legal name, or another identifier of the corresponding user of the system. In some embodiments, an entity identifier may include means of identification, such as driver's license numbers, social security numbers, or other values to identify a requester of resources.

In some embodiments, the system may generate an entity evaluation metric for the entity. For example, an entity evaluation metric may include a metric quantifying the trustworthiness of an entity submitting a resource access request. For example, an entity evaluation metric may include any metric quantifying a likelihood that a user requesting a resource is likely to adhere to any restrictions, guidelines, or policies associated with accessing the resource. For example, an entity evaluation metric may include an evaluation of whether a user of a cloud storage system executed any risky activities during previous use of the cloud storage system. Additionally or alternatively, an entity evaluation metric may include an indication of whether a customer has paid back previous BNPL loans for previous purchases (e.g., previous resources requested) based on an entity access history for the customer, as discussed below in relation to FIG. 1B. For example, an entity evaluation metric may include a credit score or another measure of the trustworthiness of the entity (e.g., a user or customer). The system may generate an entity evaluation request; an entity evaluation request may include a request for an entity evaluation metric from another entity. For example, an entity evaluation request may include a request to a credit bureau for information relating to a customer's credit. By generating an entity evaluation metric, the system may make informed decisions as to whether to provide access to a resource requested by a user based on information known about a user's behavior.

FIG. 1B shows a schematic of data structure 120 representing a resource access database corresponding to the user, in accordance with one or more embodiments. For example, FIG. 1B describes information relating to an entity (e.g., a user) corresponding to entity identifier 122. The corresponding resource access database may include previous resources associated with or requested from the user. For example, the resource access database may include resource identifiers 124 corresponding to requested resources. The resource identifiers may be associated with corresponding resource sizes 126, resource types 128, request timestamps 130, and a sum of resource sizes 132 (e.g., a sum of values for previously requested resources). By compiling information relating to a user's requested resources (whether previously requested or requested concurrently with the resource access request), the system may track a user's behavior and evaluate the resource access request accordingly. Furthermore, the system may consider requested resources in tandem in providing access to resources, thereby improving the efficiency of the disclosed embodiments.

A resource access database may include data structures including information relating to previous resources requested and/or accessed by users. For example, a resource access database may include information relating to file systems, nodes, or devices accessed or requested by users over time. A set of resources requested by a user may be associated with corresponding resource identifiers, resource sizes, and resource types. As an illustrative example, the resource access database may specify a file system address or digital resource serial number associated with a previously requested resource, as well as a corresponding file or storage size, file type, and a timestamp for the corresponding resource access request. Alternatively or additionally, the resource access database may include information relating to purchases or transactions initiated by a customer for which a line of credit (e.g., a BNPL loan) is being sought. For example, the resource access database may include information relating to the size of transactions, the types of purchases made, as well as the time at which the purchase was made. In some embodiments, the resource access database may include an entity access history, which may include information relating to resources or transactions for which resources were accessed previously (whether or not these were requested by the user). For example, an entity access history may include a credit report associated with a customer, where the credit report includes previous lines of credit accessed by the entity. In some embodiments, an entity access history may include information relating to previous files, file systems, or devices accessed by a user of a cloud storage or HPC system. By including information relating to previously requested or accessed resources, the system provides for better evaluation of the entity for determining whether or how to provide access to any further requested resources.

FIG. 1C shows a schematic for data structure 140 representing a grouping parameter set for a grouping of requested resources, in accordance with one or more embodiments. For example, a grouping parameter set may include parameters associated with a grouping of requested resources associated with a given user. The grouping parameter set may include identifiers of resources within the grouping 142 and may specify parameters associated with the grouping of resources, such as sum 144, resource type 146, and time period of timestamps 148 associated with the resources within the grouping. By generating groupings of resources, the system may handle resource access requests efficiently and characterize the nature of a user's or customer's habits, thereby providing administrators with improved information for determining how to provide access to such requested resources.

In some embodiments, the system may generate resource groupings. A resource grouping may include a classification of a resource with other resources that may share similar traits, characteristics, or parameters. For example, resource groupings may be associated with a grouping identifier, as shown in FIG. 1C. A resource grouping may, for example, include a grouping of resources or resource access requests for a particular resource type 146, such as for executable files. In some embodiments, a resource grouping may include a grouping of purchases or transactions for which a line of credit, such as a BNPL loan, is requested, where the grouping includes purchases of the same type (e.g., grocery purchases rather than electronics purchases). For example, the grouping may be associated with grouping parameters within a grouping parameter set, including a grouping class, indicating a class or type of resource associated with the grouping. As an illustrative example, the grouping class may include an indication that the group is associated with executable files or, in some embodiments, large purchases. In some embodiments, the grouping parameter set may include an indication of the time period of timestamps associated with the grouping; for example, where the grouping is of a particular range of times (e.g., as for a monthly bank statement), the grouping may include an indication of this range of times. By including information characterizing the nature of groupings of parameters within the grouping parameter set, the system enables evaluation and processing of resources accessed by a user in an efficient and flexible manner, enabling handling of resources according to parameters associated with these grouped resources.

The grouping parameter set may include an indication of a sum of resource values associated with resources in the grouping, such as sum 144. Such a sum may, for example, include a sum of the sizes of all files grouped within the grouping parameter set. Alternatively or additionally, the sum may include a sum of payment amounts or transaction values (e.g., in dollar amounts). For example, the system may determine a sum of resources within a grouping. In some embodiments, a grouping may be associated with a threshold sum amount. Based on comparing the sum of resources requested by the user with a threshold sum amount associated with the grouping (e.g., a maximum value parameter), the system may determine to associate a given resource access request for a given resource to a given grouping. For example, the system may determine to group requested resources up to the threshold sum to a first grouping and any subsequent requested resources to a second grouping (with another threshold sum). For example, the system may enable a customer to pay for certain purchases beyond a certain sum amount during a statement period with a different type of BNPL loan (e.g., with higher interest) as compared to the first purchases of the statement period, thereby enabling management of financial risk. By handling resources according to the sums of resources within the groupings, the system may handle resource requests based on how many resources, and the respective resource values, have been requested by the user, thereby improving the system's flexibility and risk mitigation.

FIG. 1D shows a schematic for data structure 160 representing a configuration parameter set and a corresponding configuration specification for an access configuration, in accordance with one or more embodiments. For example, data structure 160 includes configuration parameter set 162 corresponding to an access configuration with access configuration identifier 164. Configuration parameter set 162 may include parameters 168 associated with the access configuration, along with corresponding parameter values 170. Additionally or alternatively, data structure 160 (or another data structure) may represent configuration specification 166. For example, configuration specification 166 may include indications of allowable values for parameters 168, including upper bounds 172 or lower bounds 174 for corresponding parameter values. Access configurations, along with the corresponding configuration parameter sets, may include protocols for provision and/or access to resources for entities such as users or customers. By doing so, the system may specify security restrictions and/or access restrictions to resources, thereby protecting the system from malicious activities while providing resources to requesting entities.

In some embodiments, the system may determine an access configuration for provision of resources to entities. An access configuration may include a protocol for access to resources (e.g., as specified by configuration parameters). Additionally or alternatively, the access configuration may include restrictions or requirements for entities to access resources according to the given access configuration. For example, an access configuration may include an access plan for accessing electronic resources by the user. The plan may include restrictions on which resources may be accessible to the user (e.g., which file systems or nodes are available for data storage for the user). For example, the configuration parameter set may include a maximum value parameter specifying a maximum value for a value associated with requested resources (e.g., a sum of requested resources' value parameters). In some embodiments, the access configuration may specify configuration parameters within the configuration parameter set, including bandwidths for upload and download, access durations, monthly costs, and/or payments per year that are required of a user for access to the cloud computing system and requested resources. Additionally or alternatively, an access configuration may include a line of credit (e.g., a BNPL loan) associated with a purchase or a transaction for which a customer is requesting credit. For example, an access configuration may specify, through the corresponding configuration parameter set, interest rates, principals, payment frequencies, loan durations, and annual percentage rates associated with the BNPL loan. Configuration parameter sets may specify particular resources (e.g., payments or transactions) that may be compatible with the given access configuration (e.g., the given BNPL loan). In some embodiments, an access configuration may include other financial instruments for payment following a purchase or transaction, including credit cards or direct payment methods (e.g., through banks or checks). As such, by specifying access configurations, the system may control access to resources according to access configurations, as well as specify parameters or conditions for use of such resources, thereby improving the security of the system while mitigating the risk of malicious behavior.

In some embodiments, some access configurations may be accessible or available to the user or to the system, while other access configurations may be inaccessible or unavailable (e.g., based on a trustworthiness or credit score, such as an entity evaluation metric for the requesting entity). For example, a configuration parameter of the configuration parameter set may include a threshold evaluation metric. The system may compare a determined entity evaluation metric with the threshold evaluation metric and provide access to the selected resource according to this access configuration only when the entity evaluation metric is above the threshold evaluation metric. In some embodiments, based on the entity evaluation metric or otherwise, the system may update or modify a configuration parameter set associated with the access configuration. For example, the system may lower the maximum bandwidth and/or increase interest rates for a BNPL loan based on a determination that the entity evaluation metric is less than the threshold evaluation metric. By doing so, the system may ensure that entities that may be less trustworthy or less able to pay back loans are provided with restrictions or less favorable terms for accessing the resource, thereby improving system security.

In some embodiments, the system may transmit an authorization request for a configuration parameter set requested by a user. For example, the user may request a set of configuration parameters for accessing a requested resource. The system may transmit this requested configuration parameter set for authorization by an administrator system (or, e.g., a merchant or lender for a line of credit for accessing the resource). Based on this authorization request, the system may receive an authorization indication indicating whether the requested configuration parameter set is allowed or acceptable. By receiving such an indication based on requested configuration parameters, the system enables flexibility for users or customers, as they may request specific parameters that may be beneficial to them. However, the requested resource may be accessed according to this access configuration subject to administrator (e.g., merchant/lender) review. By doing so, the system also preserves administrator control of the system, thereby enhancing system security while improving user experience.

In some embodiments, the system may specify configuration criteria. Configuration criteria may include specifications for access configurations indicating requirements for the respective access configurations. For example, configuration criteria may include configuration specification 166 for a given access configuration associated with access configuration identifier 164. For example, a configuration specification may indicate requirements for access configuration parameters associated with a given configuration parameter set. As an illustrative example, configuration specification 166 may include upper bound 172 or lower bound 174 for some or all parameters 168 of configuration parameter set 162. Configuration specification 166 may include restrictions on what values are allowed for a given access configuration; for example, configuration specification 166 may indicate that only certain purchases from certain vendors or of certain types (e.g., groceries) are compatible with a given access configuration (e.g., a given BNPL loan).

In some embodiments, configuration specification 166 may be determined or set by an administrator system, merchant, or lender. The configuration specification may indicate rules or requirements for how to determine how resources are to be grouped into a given configuration specification. For example, a configuration specification may include an indication of which categories of purchases a given BNPL loan (or another access configuration) may be used for automatic provision of resources to a user. As an illustrative example, a user may choose a given access configuration (e.g., BNPL loan) for automatic provision of lines of credit for purchases of a certain type up to a specified value. The configuration specification may specify, based on administrator/merchant/lender approval, the allowed values for types and resource values (e.g., allowed resource parameters) that a given BNPL loan or access configuration may be modified to have. Subsequently, upon user selection of these values for a given configuration specification, the system may provide access to subsequent resources of the same type and value according to this given access configuration. As such, the configuration specification enables automatic handling of resources according to resource parameters, thereby improving the system's efficiency for handling resource requests; furthermore, by enabling administrator systems to determine how these access configurations may be modified by the user, the system provides administrator control of the system, thereby improving its security.

FIG. 2 shows illustrative display 200 of resource access instructions for a user on a user interface, in accordance with one or more embodiments. For example, illustrative display 200 may include user interface 202 for display to an entity (e.g., a user or a customer). User interface 202 may include an indication of resource access instructions and may include controls, such as buttons (e.g., button 206), radio buttons, drop-down menus, or any other controls associated with user interfaces. By displaying such instructions and alerts to the user, the system may alert the user of any actions that may need to be taken for access to resources.

For example, the system may determine and/or display resource access instructions associated with an access configuration (e.g., as included within a configuration parameter set). Resource access instructions may include requirements, instructions, or commands for a user, customer, or other entity for access to requested resources. For example, resource access instructions (e.g., as specified in FIG. 1D) may include payments required to be made each year (e.g., one payment a month). In some embodiments, the instructed payments may be specified (e.g., as shown through the monthly cost in data structure 160). Penalties for failure to make such payments may be specified through configuration parameter sets, such as through the specification of interest rates or annual percentage rates. In some embodiments, the system may transmit warnings or messages indicating required actions for the user or customer to take for access to a given BNPL loan or another access configuration to be granted. By doing so, the system enables provision of resources subject to requirements or restrictions imposed by administrators, thereby improving system security and mitigating risk (e.g., risk due to failure to make payments to the system).

In some embodiments, the system may determine to generate a warning message to a user for display based on a failure to execute instructed actions beyond a threshold elapsed time. For example, the system may determine that a user has not executed a resource access instruction within a required time frame (e.g., an elapsed time from a first time or a time of accessing the resource). As an illustrative example, the system may determine that a payment, from a customer for which a BNPL loan has been awarded, has not been received. As such, the system may determine that one or more of the resource access instructions have not been executed by the first entity (e.g., the customer) and, as such, may display a warning message for the first entity to complete the requested action. By doing so, the system may ensure compliance with any restrictions or conditions for provision of the resource to the entity.

Figure 3:
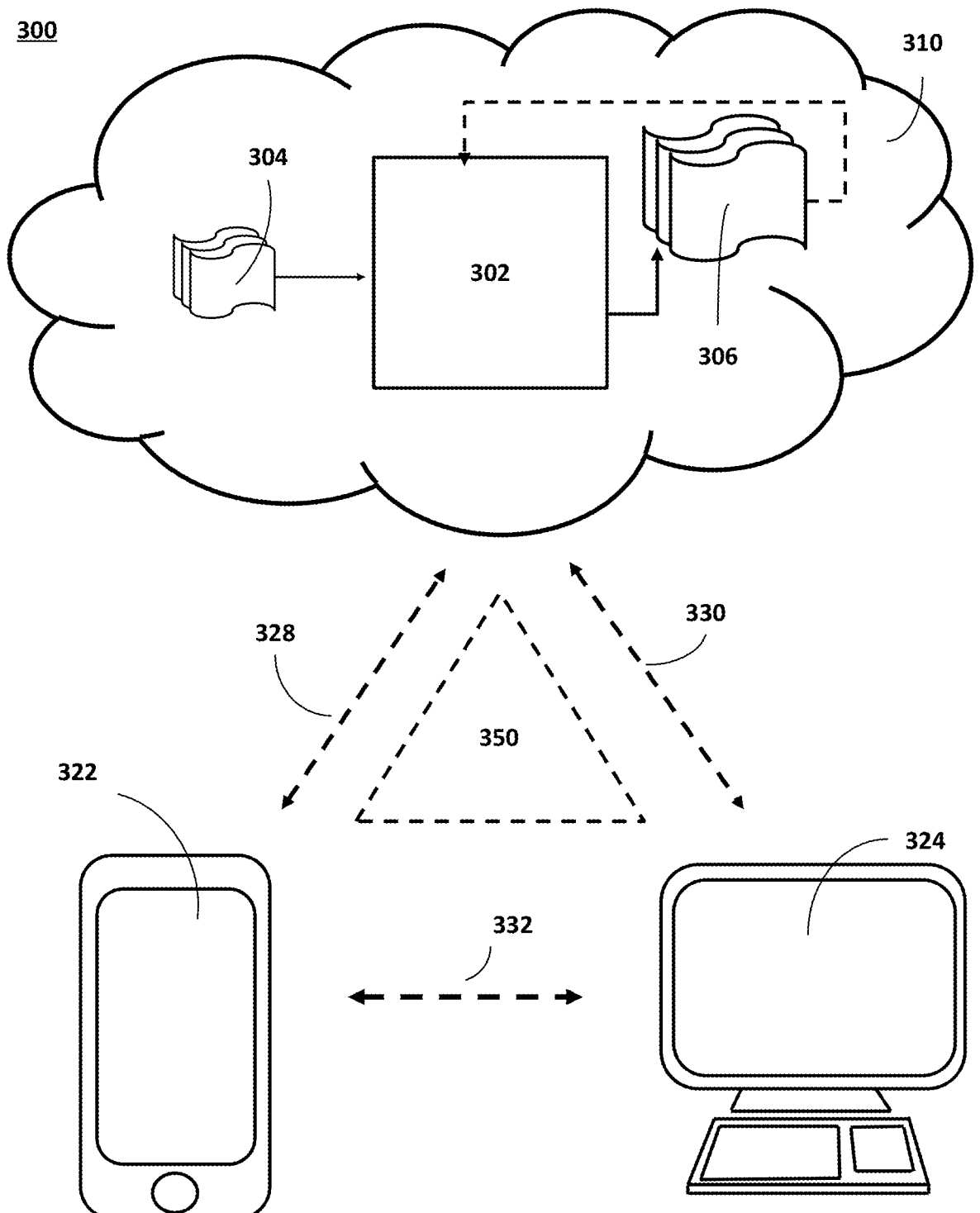
FIG. 3 shows illustrative components for a system used to control user access to resources according to user preference, in accordance with one or more embodiments.

FIG. 3 shows illustrative components for a system used to control access to resources requested by users, in accordance with one or more embodiments. For example, FIG. 3 may show illustrative components for determining parameters for access configurations, such as BNPL loans for purchases, based on user (e.g., customer) and administrator (e.g., merchant/lender) inputs. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a handheld computer, and other computer equipment (e.g., a server), including "smart," wireless, wearable, and/or mobile devices. FIG. 3 also includes cloud components 310. Cloud components 310 may alternatively be any computing device as described above and may include any type of mobile terminal, fixed terminal, or other device. For example, cloud components 310 may be implemented as a cloud computing system and may feature one or more component devices. It should also be noted that system 300 is not limited to three devices. Users may, for instance, utilize one or more devices to interact with one another, one or more servers, or other components of system 300. It should be noted that while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational responses, queries, and/or notifications).

Additionally, as mobile device 322 and user terminal 324 are shown as a touchscreen smartphone and personal computer, respectively, these displays also act as user input interfaces. It should be noted that in some embodiments, the devices may have neither user input interfaces nor displays and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include resource access requests, including resource parameters, as well as associated data structures, such as grouping parameter sets (e.g., data structure 140). In some embodiments, cloud components 310 may receive, store, or transmit information relating to access configurations, such as configuration parameter sets and/or configuration criteria, including configuration specifications.

Cloud components 310 may access databases, including resource access databases, or access configuration databases. In some embodiments, cloud components 310 may access or query other databases (e.g., from third parties), such as credit agency databases or user activity databases.

Cloud components 310 may include model 302, which may be a machine learning model, artificial intelligence model, etc. (which may be referred collectively as "models" herein). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., a trustworthiness or creditworthiness metric, such as a user evaluation metric, or a determination as to whether to provide access to a resource according to an access configuration based on an entity's prior activity).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, backpropagation techniques may be utilized by model 302, where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., whether a user is trustworthy or creditworthy).

In some embodiments, the model (e.g., model 302) may automatically perform actions based on outputs 306. In some embodiments, the model (e.g., model 302) may not perform any actions. The output of the model (e.g., model 302) may be used to determine or modify configuration parameters relating to the provision of resources to a user, customer, or other entity.

System 300 also includes API layer 350. API layer 350 may allow the system to generate summaries across different devices. In some embodiments, API layer 350 may be implemented on mobile device 322 or user terminal 324. Alternatively or additionally, API layer 350 may reside on one or more of cloud components 310. API layer 350 (which may be a REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web services, using resources like Service Repository and Developer Portal, but with low governance, standardization, and separation of concerns. Alternatively, system 300 may be fully based on API layer 350, such that separation of concerns between layers like API layer 350, services, and applications is in place.

In some embodiments, the system architecture may use a microservice approach. Such systems may use two types of layers: Front-End Layer and Back-End Layer, where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying WAF and DDOS protection, and API layer 350 may use RESTful APIs as standard for external integration.

Figure 4:
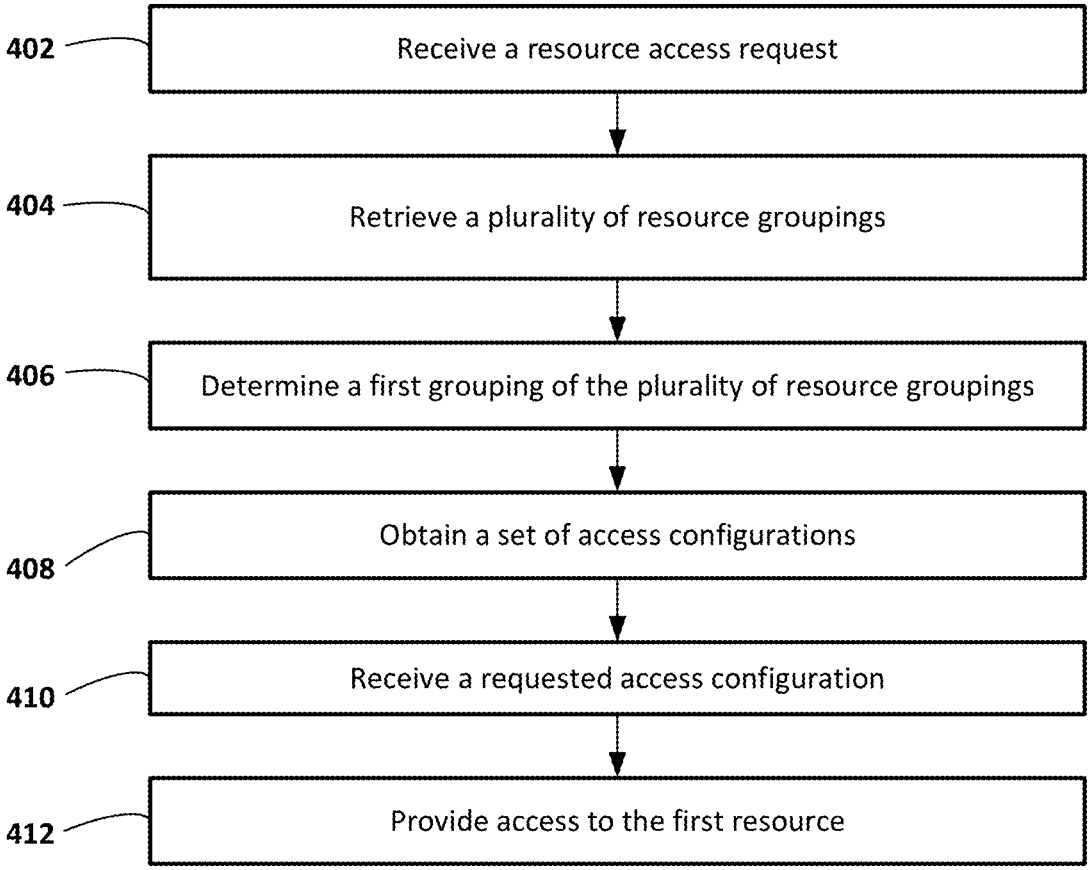
FIG. 4 shows a process of the operations involved in controlling user access to groupings of resources according to administrator and user preference, in accordance with one or more embodiments.

FIG. 4 shows process 400 of the operations involved in controlling user access to groupings of resources according to administrator and user preference, in accordance with one or more embodiments. For example, process 400 enables grouping requested resources, such as lines of credit or electronic resources, into groups based on associated resource parameters. Thus, the system may determine access configurations that are available to a user based on these groupings while enabling user selection and modification of these access configurations, as subject to administrator controls.

At 402, process 400 (e.g., using one or more components described above) enables the system to receive a resource access request. For example, the system may receive a resource access request from a first entity, where the resource access request includes a first resource parameter set corresponding to a first resource requested by the first entity. As an illustrative example, the system may receive a request from a customer of a merchant for a line of credit for a particular transaction or payment. By receiving such requests, the system may determine whether to provide access to the requested line of credit for the given transaction, as well as any parameters or terms for the line of credit.

At 404, process 400 (e.g., using one or more components described above) enables the system to retrieve a plurality of resource groupings. For example, the system may retrieve a plurality of resource groupings, wherein each resource grouping of the plurality of resource groupings includes a corresponding grouping class and a corresponding grouping parameter set. As an illustrative example, the system may obtain or retrieve information relating to previous resources that were requested, as organized or classified according to resource parameters (e.g., attributes associated with the given resources). A resource grouping may include, for example, a grouping of transactions for which BNPL loans have been previously requested or obtained by the first entity (e.g., the customer), where the transactions within the grouping are all related to a similar type of purchase (e.g., grocery purchases) or relate to purchases under a certain resource value (e.g., under $50). By grouping resources together, the system may handle requests for resources more efficiently by handling similar transactions with similar access configurations (e.g., BNPL loans). By retrieving such groupings, the system may evaluate which grouping with which to classify the resource currently requested by the entity.

At 406, process 400 (e.g., using one or more components described above) enables the system to determine a first grouping of the plurality of resource groupings. For example, the system may determine a first grouping of the plurality of resource groupings for the first resource based on the first resource parameter set, wherein the first grouping is associated with a first grouping parameter set. As an illustrative example, the system may group all purchases of the same type (e.g., a resource type) together within the same grouping. By organizing resources into the groupings based on similar parameters, the system may more efficiently provide access to the resource requested by, for example, bundling similar transactions and payments and providing access to a line of credit (or, e.g., another access configuration) for these transactions together.

In some embodiments, the system may determine a first resource type for the first resource in order to determine the first grouping. For example, the system may determine a first resource type for the first resource from a first parameter of the first resource parameter set. The system may obtain a first plurality of resources associated with the first grouping and a corresponding plurality of resource parameter sets, wherein each resource parameter set is associated with an associated resource of the first plurality of resources. The system may determine that each resource parameter set of the corresponding plurality of resource parameter sets includes an associated resource parameter, wherein the associated resource parameter corresponds to the first resource type for the first resource. Based on determining that each resource parameter set includes the associated resource parameter, the system may generate the first grouping to include the first plurality of resources. As an illustrative example, the system may determine that the requested resource is a line of credit (e.g., a BNPL loan) for a grocery purchase. The system may determine a grouping based on resources that are all directed toward grocery purchases (e.g., a given resource type). By doing so, the system may handle similar resources (e.g., lines of credit for similar purchases) together, thereby improving the efficiency of resource provision to the requesting entity.

In some embodiments, the system may determine resource groupings based on a sum associated with previously requested resources for the user. For example, the system may determine a first resource value based on the first resource parameter set, wherein the first resource value indicates a first quantitative measure of the first resource. The system may determine an entity identifier corresponding to the first entity based on the resource access request. The system may retrieve, from a resource access database, a plurality of requested resources associated with the first entity, wherein the plurality of requested resources includes previously requested resources requested by the first entity. The system may determine a plurality of resource values, wherein each resource value of the plurality of resource values indicates a corresponding quantitative measure of a corresponding previously requested resource. The system may generate a sum value of the first resource value and each resource value in the plurality of resource values and the first resource. The system may compare the sum value with a threshold value associated with the first grouping.

Based on comparing the sum value with the threshold value associated with the first grouping, the system may determine the first grouping to include the plurality of requested resources and the first resource. For example, the system may determine to include purchases or transactions for which lines of credit are requested within the first grouping until the sum of a value associated with such purchases or transactions (e.g., a total dollar amount) is below a threshold value associated with the first grouping. For any subsequent purchases or transactions above this sum, the system may determine another grouping. By doing so, the system may handle requests from entities according to the size of the requests. For example, the system may determine that a user may have less favorable terms for the requested line of credit for a larger amount of purchases or transactions for which lines of credit are requested, thereby disincentivizing irresponsible or malicious use of the system.

In some embodiments, the system may determine groupings based on timestamps associated with the requests for resources. For example, the system may determine a first timestamp based on the first resource parameter set, wherein the first timestamp indicates a time associated with requesting the first resource. The system may determine one or more timestamps associated with the first grouping based on the first grouping parameter set, wherein the one or more timestamps indicate a time period associated with resources within the first grouping. Based on comparing the first timestamp with the one or more timestamps, the system may determine the first grouping to include the first resource. As an illustrative example, the system may determine a group of transactions for which lines of credit are requested by an entity (e.g., a customer) based on a defining period of time (e.g., a statement period). The system may determine that a subset of the resources previously requested by the customer was requested within a given month, for example, and group such transactions together. By doing so, the system may consider the provision of lines of credit to the requesting customer on a temporal basis, thereby improving the efficiency of providing the requested lines of credit to the customer.

In some embodiments, the system may determine a grouping parameter set based on a sum and a time period associated with the resources within the group. For example, the system may retrieve a first plurality of resources associated with the first grouping. Based on the first plurality of resources, the system may determine a sum value for the first grouping, wherein the sum value indicates a sum of a plurality of resource values associated with the first plurality of resources. Based on retrieving a plurality of timestamps corresponding to the first plurality of resources, the system may determine an indication of a period of time associated with the first plurality of resources. The system may generate the first grouping parameter set, the first grouping parameter set comprising the sum value and the indication of the period of time as corresponding grouping parameters. As an illustrative example, the system may determine a sum of values associated with requested transactions within a grouping, as well as a time period characterizing the grouping (e.g., an indication of a monthly period for a bank statement for the transactions). The system may generate the grouping parameter set according to these values (e.g., the sum of resource values and the time period characterizing the grouping). By doing so, the system may, upon receiving further requests for lines of credit, determine whether to accept these resources into this defined grouping, thereby enabling efficient, automatic handling of providing access to an entity in response to resource requests.

At 408, process 400 (e.g., using one or more components described above) enables the system to obtain a set of access configurations. For example, the system may obtain, from a second entity, a set of access configurations based on the first grouping parameter set, wherein each access configuration of the set of access configurations is associated with an associated configuration parameter set, wherein each configuration parameter set indicates a protocol for an associated access configuration, and wherein a corresponding configuration parameter of the associated configuration parameter set matches a corresponding resource parameter of the first grouping parameter set. As an illustrative example, the system may determine access configurations (e.g., BNPL loans or other instances of lines of credit) that are consistent with the parameters defining a given grouping of resources (e.g., a given bundle of transactions). The system may compare grouping parameters (e.g., a sum of values associated with transactions within a grouping) with a corresponding requirement or characterization of the BNPL loan (e.g., configuration parameters associated with an access configuration) in order to determine whether the grouping of requested resources is consistent with the given access configuration. By doing so, the system may provide access to resources only according to restrictions or requirements as determined by system administrators, merchants, or lenders, thereby maintaining system security.

In some embodiments, the system may obtain the set of access configurations by receiving available access configurations from the second entity (e.g., from an administrator system, merchant, or lender) where the available access configurations are consistent with an entity evaluation metric. For example, the system may receive, from the second entity, a plurality of available access configurations. The system may determine a first entity evaluation metric for the first entity, the first entity evaluation metric indicating a degree of trustworthiness for the first entity. The system may retrieve a threshold evaluation metric associated with a first access configuration of the plurality of available access configurations. The system may compare the first entity evaluation metric with the threshold evaluation metric. Based on determining that the first entity evaluation metric is greater than the threshold evaluation metric, the system may generate the set of access configurations to include the first access configuration. For example, the system may receive access configurations (e.g., lines of credit or BNPL loans) that are consistent with entities (e.g., users or customers) with a high evaluation metric (e.g., a high credit score or trustworthiness score). Such access configurations may include, as configuration parameters, a threshold evaluation metric, such as a minimum credit score required for access to a given BNPL loan. The system may, therefore, receive access configurations (e.g., options or terms for lines of credit) that are consistent with an evaluation of the entity requesting the resources. Thus, the system may protect the system from entities that are not trustworthy or creditworthy enough for particular lines of credit (e.g., particular access configurations) while determining access configurations that are consistent with the entities. As such, the system may improve its risk mitigation abilities, thereby contributing to system security.

In some embodiments, the system may determine the entity evaluation metric by querying a server system. For example, the system may determine an entity identifier corresponding to the first entity based on the resource access request. The system may transmit an entity evaluation request to a server system, wherein the entity evaluation request comprises the entity identifier and a request for an evaluation of the first entity. In response to transmitting the entity evaluation request, the system may receive the first entity evaluation metric from the server system. As an illustrative example, the system may query a database associated with a credit agency or another evaluation agency and, in response to this request, receive a metric that serves as an evaluation of the first entity. For example, the system may receive a credit score associated with the user based on this request. As such, the system may evaluate the entity for determination of which access configurations (e.g., BNPL loans) for which the customer may be eligible. By doing so, the system improves the accuracy and mitigates risk associated with determining to provide lines of credit or electronic resources to customers or users. Furthermore, by doing so, the system enables mitigation of inaccurate or malicious information submitted by the first entity through the resource access request.

In some embodiments, the system may update access configuration parameters or the set of access configurations based on the first entity evaluation metric. For example, the system may generate an updated set of access configurations based on the first entity evaluation metric, wherein each access configuration of the updated set of access configurations is associated with a corresponding updated configuration parameter set. The system may transmit a second request to the first entity for an access protocol for providing the first resource, wherein the second request comprises an indication of the set of access configurations, wherein the second request includes an indication of the updated set of access configurations. The system may receive the requested access configuration in response to the second request. As an illustrative example, the system may update the set of available access configurations based on the evaluation metric (e.g., the credit score) by, for example, filtering out access configurations, such as BNPL loans, that are not consistent with the corresponding evaluation metric, such as where threshold evaluation metrics are greater than the entity evaluation metric. In some embodiments, the system may update parameters associated with the set of access configurations. For example, the system may determine to increase configuration parameters, such as interest rates or annual percentage rates, or determine to change the duration of the BNPL loan based on the credit score of the requesting customer. By doing so, the system may mitigate risk against users or customers who may be less trustworthy.

In some embodiments, the system may obtain the set of access configurations based on comparing parameters of given grouping parameter sets with configuration parameters associated with access configurations. For example, the system may receive a plurality of available access configurations from the second entity, wherein each available access configuration of the plurality of available access configurations is associated with an associated available configuration parameter set of a plurality of available configuration parameter sets. The system may compare one or more grouping parameters of the first grouping parameter set with one or more respective parameters of each available configuration parameter set of the plurality of available configuration parameter sets. Based on determining that the one or more grouping parameters match the one or more respective parameters, the system may determine the set of access configurations from the plurality of available access configurations. As an illustrative example, the system may determine a set of access configurations (e.g., a set of BNPL loan terms) that are consistent with parameters associated with the grouping of resources (e.g., transactions). For example, the system may determine a subset of access configurations that are consistent with a grouping of resources with a sum of transaction values smaller than a given threshold sum and of a given transaction type (e.g., grocery purchases). By doing so, the system may match resource groupings with access configurations that are consistent with the resources, thereby enabling administrator, merchant, or lender control over which types of transactions (e.g., which attributes of resources) are provided with corresponding access configurations (e.g., lines of credit), thereby improving the security and efficiency of provision of resources, such as payment for transactions, to the user or customer.

In some embodiments, the system may determine a satisfactory access configuration for the requested resource based on a maximum value parameter associated with the given access configuration. For example, the system may determine a sum value parameter from the first grouping parameter set. The system may determine a plurality of maximum value parameters, wherein each maximum value parameter of the plurality of maximum value parameters is associated with the associated available configuration parameter set. Based on determining that the sum value parameter is less than each maximum value parameter of a subset of the plurality of maximum value parameters, the system may determine the set of access configurations to include a subset of access configurations, wherein each access configuration of the subset of access configurations is associated with a corresponding maximum value parameter of the subset of the plurality of maximum value parameters. As an illustrative example, the system may determine access configurations (e.g., types of BNPL loans) that are consistent with the value of resources within the bundle of resources (e.g., the bundle of transactions). For example, the system may determine that the grouping of resources has a sum resource value that is less than a maximum value associated with a corresponding configuration parameter of a given access configuration. The system may determine to include this given access configuration within the set of access configurations available for provision of the line of credit to the user for the given grouping of purchases or transactions (e.g., resources). By doing so, the system may ensure that only access configurations (e.g., loans) that are consistent with the dollar amount requested by a given customer are provided as options, thereby improving system security and mitigating financial risk of providing resources to the given users.

At 410, process 400 (e.g., using one or more components described above) enables the system to receive a requested access configuration (e.g., from the first entity, such as a user or a customer). For example, the system may receive, from the first entity, a requested access configuration of the set of access configurations for accessing the first resource. As an illustrative example, the system may receive, from a customer, a selection of a given access configuration (e.g., a given BNPL option) that is consistent with the set of access configurations provided to the customer. The system may receive a selection of a BNPL loan, along with associated configuration parameters, such as an interest rate, annual percentage rate, loan duration, or other parameters associated with the loan. As such, the system enables the customer to select a desired access configuration for the resource (e.g., a desired set of terms for a line of credit for payment of a purchase in installments). By doing so, the system enables customer flexibility and control over how resources are received while still operating within guidelines or restrictions imposed by an administrator system (e.g., by a merchant, lender, or system administrator).

In some embodiments, the system may receive a requested set of access configurations from the user or customer and transmit this to an authoritative system (e.g., a merchant, lender, or administrator system) for approval. For example, the system may receive, from the first entity, a requested configuration parameter set corresponding to the requested access configuration. The system may transmit an authorization request to the second entity, the authorization request comprising the requested configuration parameter set. The system may receive an authorization indication from the second entity. Based on receiving the authorization indication from the second entity, the system may modify the requested access configuration and the associated configuration parameter set to include the requested configuration parameter set. As an illustrative example, the system may receive a set of modified BNPL loan terms that are desired by a customer requesting a line of credit for payments associated with a given purchase or transaction (or a grouping thereof). In response to this set of modified loan terms, the system may transmit these configuration parameters to an authoritative entity within the system, such as a merchant, lender, or system administrator, for approval (e.g., for authorization). The system may, subsequently, receive an authorization indicator indicating whether the requested access configurations are acceptable or not. Based on this authorization indicator, the system may modify or confirm the requested access configuration and parameters or, in some embodiments, may reject the request by retaining an original configuration parameter set prior to modification. By doing so, the system provides a user or a customer a way to request more favorable terms for accessing resources (e.g., by providing an avenue for input) while providing authoritative entities with control over whether such terms are acceptable or not. As such, the system improves user flexibility and experience while maintaining system security and mitigation of risk (e.g., financial risk).

At 412, process 400 (e.g., using one or more components described above) enables the system to provide access to the first resource. For example, the system may provide access to the first resource for the first entity according to the requested access configuration and the associated configuration parameter set. As an illustrative example, the system may disburse a BNPL loan based on the selected access configuration (e.g., the selected loan), as well as associated terms for the loan (e.g., as defined by the associated configuration parameter set). By doing so, the system enables provision of resources according to both user or customer preference, as well as administrator or merchant/lender preference. By doing so, the system improves flexibility of the provision of electronic resources and/or financial resources while maintaining system security and risk mitigation.

In some embodiments, the system may provide access to the requested resource based on providing resource access instructions to the user. For example, the system may determine, based on the first resource parameter set, a plurality of resource access instructions for accessing the first resource. The system may transmit, to the first entity, the plurality of resource access instructions. As an illustrative example, the system may transmit to a user or customer requesting access to resources (e.g., a line of credit) information relating to restrictions or guidelines associated with the line of credit. For example, the system may transmit payment instructions, as well as a payment timetable associated with repayment of a BNPL loan provided to the user for the grouping of resources. By doing so, the system may ensure that the user or customer executes any requirements associated with the terms (e.g., configuration parameters) of the associated access configuration.

In some embodiments, the system may warn the first entity (e.g., the user or the customer) of any instructions that have not been executed within a timeframe. For example, the system may determine a first time, wherein the first time indicates a time at which the first entity accesses the first resource. The system may generate, at a second time, an indication of whether the first entity has executed each instruction of the plurality of resource access instructions, wherein the second time is greater than a threshold elapsed time from the first time. Based on the indication of whether the first entity has executed each instruction of the plurality of resource access instructions, the system may transmit a warning message to the first entity, wherein the warning message indicates a subset of instructions of the plurality of resource access instructions for the first entity to execute. For example, the system may detect that a customer who received a BNPL loan has not completed any required payments or has not complied with restrictions, such as those defined by the corresponding configuration parameter set. The system may warn the user or customer that this has not occurred within an elapsed period of time (e.g., a grace period), thereby providing the user the opportunity to cure the incompliance.

In some embodiments, the system may update the resource access database based on compliance with the resource access instructions. For example, the system may retrieve, from a resource access database, an entity access history for the first entity, wherein the entity access history includes information relating to previously accessed resources associated with the first entity. The system may update the entity access history to include the indication of whether the first entity has executed each instruction of the plurality of resource access instructions. As an illustrative example, the system may determine a payment history for the first entity repaying the provided resource (e.g., a line of credit corresponding to a BNPL loan). The system may populate the resource access database with information relating to compliance with any payment instructions associated with the BNPL loan (e.g., any resource access instructions associated with the corresponding access configuration, such as those defined in a corresponding configuration parameter set). By doing so, the system may compile information relating to the behavior of the first entity, thereby influencing and improving decisions for resource provision to this entity with respect to any further resource requests.

In some embodiments, a third party may update configuration parameters associated with requested access configuration. For example, the system may receive, from a third entity, an updated configuration parameter set corresponding to the requested access configuration of the set of access configurations. The system may provide access to the first resource for the first entity according to the updated configuration parameter set. As an illustrative example, the system may receive updated loan terms from a merchant (e.g., as distinct from the second entity, which may be a lender, for example). For example, the merchant may specify different loan terms for trusted customers and provide updated configuration parameters (e.g., BNPL loan terms) accordingly. By doing so, the system enables further tailoring of how resources are provided to users or customers based on other stakeholders or entities.

Figure 5:
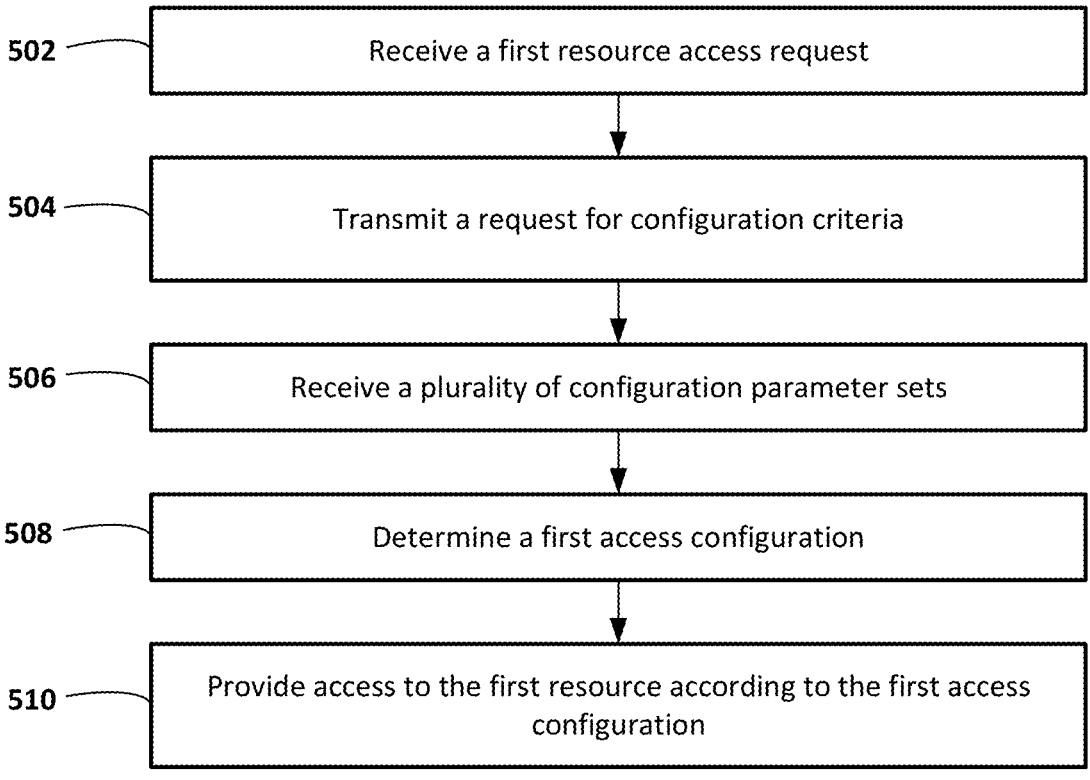
FIG. 5 shows a process of the operations involved in dynamically mediating user access to resources based on user and administrator system input, in accordance with one or more embodiments.

FIG. 5 shows process 500 of the operations involved in dynamically mediating user access to resources based on user and administrator system input, in accordance with one or more embodiments. For example, process 500 enables controlling access to lines of credit or loans based on dynamic categorization of transactions or purchases based on access configurations (e.g., loan terms) determined based on customer and merchant or lender input.

At 502, process 500 (e.g., using one or more components described above) enables the system to receive a first resource access request. For example, the system may receive a first resource access request from a device associated with a first entity, the first resource access request comprising a first resource parameter set corresponding to a first resource. As an illustrative example, as discussed in relation to FIG. 4 at 402, the system may receive a request from a customer (e.g., a user of a system) for a line of credit for transactions or payments. By receiving such requests, the system may determine whether to provide access to the requested resource for the given transaction, as well as any parameters or terms for the corresponding access configuration. As such, the system enables receipt of user input for requested resources for further evaluation and provision of resources.

At 504, process 500 (e.g., using one or more components described above) enables the system to transmit a request for configuration criteria to a second entity. For example, the system may obtain, from a first system (e.g., an administrator system, a merchant, or a lender), configuration criteria, wherein the configuration criteria comprises a set of specifications, wherein each specification of the set of specifications indicates requirements for a corresponding configuration parameter set for a corresponding access configuration of a set of access configurations, and wherein the corresponding configuration parameter set indicates a protocol for accessing resources based on the corresponding access configuration. As an illustrative example, the system may request information relating to requirements, restrictions, or specifications of access configurations. The system may request requirements for values that parameters of a configuration parameter set for a given access configuration may have, such as maximum values, minimum values, or possible allowed values. For example, the system may request information from merchants or lenders relating to requirements for BNPL loans corresponding to access configurations, including ranges for allowed interest rates or annual percentage rates, loan durations, loan principals, or allowed transaction/purchase types associated with a given BNPL loan. By requesting such information, the system enables modifications to the access configurations within bounds specified by authoritative entities, such as merchants, lenders, or administrator systems.

In some embodiments, the system may receive a configuration specification that includes an upper bound and a lower bound for a given parameter in an associated configuration parameter set for an associated access configuration. For example, the system may receive a first requirement for a first configuration parameter of a first configuration parameter set corresponding to the first access configuration of the set of access configurations, wherein the first requirement includes an upper bound on the first configuration parameter. The system may receive a second requirement for the first configuration parameter of the first configuration parameter set, wherein the second requirement includes a lower bound on the first configuration parameter. The system may generate the configuration criteria to include a first specification for the first access configuration, wherein the first specification includes the first requirement and the second requirement. As an illustrative example, the system may receive upper and lower bounds for parameters associated with the access configuration, such as an upper bound and a lower bound for an interest rate on a line of credit that may be available to the first entity or user. By receiving specifications or requirements for configuration parameters, the system enables administrator, merchant, or lender control over which payments of transactions or resources are allowed to be provided using a given access configuration while enabling a user or customer some flexibility over the nature of the access configuration.

At 506, process 500 (e.g., using one or more components described above) enables the system to receive configuration parameter sets from a device (e.g., an entity) that satisfies the specifications of the configuration criteria. For example, the system may receive, from the device, a plurality of configuration parameter sets, wherein a respective configuration parameter set of the plurality of configuration parameter sets satisfies a respective specification of the configuration criteria. As an illustrative example, the system may receive a set of access configurations for which configuration parameter sets have been selected or modified by the user according to any requirements specified by the configuration criteria and specifications. For example, the system may receive access configurations specifying terms for BNPL loans, such as interest rates or loan durations, where these terms are within the bounds limited by any requirements within corresponding specifications. In some embodiments, the system may receive, from a customer, a set of such access configurations, where the access configurations include configuration parameters that specify different circumstances or variables; for example, a customer or user may specify resource types associated with each of these access configurations, such that resources according to particular resource types are handled by particular access configurations. By doing so, the system enables subsequent handling of resource access requests according to user or customer preference by sorting such requests into customer- or user-defined access configurations while still subject to administrator system, merchant, or lender approval as defined by the configuration criteria.

In some embodiments, the system may determine that access configurations received from the user are consistent with the configuration criteria. For example, the system may determine a first parameter of a first parameter set of the plurality of configuration parameter sets received from the device, wherein the first parameter corresponds to the first configuration parameter of the first access configuration and wherein the first parameter set corresponds to the first access configuration. The system may compare the first parameter with the first requirement and the second requirement. Based on determining that the first parameter is greater than or equal to the first requirement and less than or equal to the second requirement, the system may determine that the first parameter set satisfies the first specification of the first access configuration. As an illustrative example, the system may determine that configuration parameters associated with the first parameter set for the first access configuration are between the upper and lower bounds specified by the first and second requirements (or otherwise satisfy the first and/or second requirements). For example, the system may determine that interest rates or lending durations are consistent with a corresponding specification for a BNPL loan chosen by a customer through the device. By doing so, the system may ensure that the first entity's provided access configurations have parameters that are consistent with any requirements specified in the corresponding specification.

At 508, process 500 (e.g., using one or more components described above) enables the system to determine a first access configuration for the first resource. For example, the system may determine a first access configuration of the set of access configurations, wherein parameters of the first resource parameter set are consistent with the first access configuration. As an illustrative example, the system may determine that the first resource, according to information within the first resource parameter set, is consistent with configuration parameters associated with the first access configuration. For example, the system may determine that a resource type associated with the first resource parameter set (e.g., a transaction type associated with a customer's request for a line of credit) corresponds to a transaction type as allowed by the first access configuration's configuration parameter set. By doing so, the system may determine compatible access configurations (e.g., BNPL loans) for corresponding resources (e.g., credit for purchases) requested by users, customers, or other entities.

In some embodiments, the system may determine the first access configuration based on a resource type. For example, the system may determine a first resource type based on the first resource parameter set. The system may determine a second resource type based on a first configuration parameter set corresponding to the first access configuration. The system may determine that the first resource type corresponds to the second resource type. As an illustrative example, the system may determine that the first access configuration includes a configuration parameter that specifies that only transactions of a certain type (e.g., grocery purchases) may be accorded a corresponding line of credit (e.g., a BNPL loan). The system may determine that the first resource corresponds to a grocery purchase and provide access to the line of credit corresponding to the first access configuration accordingly. By doing so, the system may automatically classify and provide access to resources based on matching access configurations, with parameters tuned by the user or customer (e.g., the first entity). As such, the system enables user or customer flexibility in how resources are provided.

At 510, process 500 (e.g., using one or more components described above) enables the system to provide access to the first resource according to the first access configuration. For example, the system may provide, to the device, access to the first resource according to the first access configuration. As an illustrative example, the system may dynamically provide access to a line of credit, such as a BNPL loan, according to parameters associated with a transaction or purchase for which the line of credit is requested, such as the transaction type or value. Furthermore, the system may provide this access based on the parameters associated with the line of credit itself, such as conditions or values associated with the loan (e.g., interest rates or compatible purchase types). As such, conditions or parameters associated with the loan may be tuned by both the customer (e.g., a first entity) and the merchant (e.g., a second entity, such as an administrator system), thereby providing flexibility and control over the access configuration and provision of resources.

In some embodiments, the system may determine resource access instructions associated with the access configuration for provision of access to the resource. For example, based on the first resource parameter set, the system may determine a plurality of resource access instructions for accessing the first resource. The system may transmit, to the device, the plurality of resource access instructions. As such, the system enables provision of instructions to the first entity (e.g., a user or a customer) for access to the requested resource (e.g., the line of credit or file system in a cloud storage system). As an illustrative example, the system may specify loan terms and payment plans associated with a BNPL loan (e.g., the first access configuration). By doing so, the system enables the customer to receive access to requested resources according to terms specified by the customer while such terms are still controlled by the second entity (e.g., the administrator, merchant, or lender), who may specify and restrict the flexibility of these terms.

In some embodiments, the system may determine whether such instructions have been executed by the first entity within a threshold elapsed period of time and generate a warning depending on this determination. For example, the system may determine a first time, wherein the first time indicates a time at which the device accesses the first resource. The system may generate, at a second time, an indication of whether the device has executed each instruction of the plurality of resource access instructions, wherein the second time is greater than a threshold elapsed time from the first time. Based on the indication of whether the device has executed each instruction of the plurality of resource access instructions, the system may transmit a warning message to the device, wherein the warning message indicates a subset of instructions of the plurality of resource access instructions for the first entity to execute. For example, the system may determine that a customer has not made required payments on a provided BNPL loan beyond a certain amount of time; based on this determination, the system may warn the customer to execute any such instructions for further access to this or other lines of credit.

In some embodiments, the system may update an access history associated with the first entity (e.g., the user of a cloud storage system or a merchant). For example, the system may retrieve, from a resource access database, an access history for the first entity, wherein the access history includes information relating to previously accessed resources associated with the first entity. The system may update the access history to include the indication of whether the first entity has executed each instruction of the plurality of resource access instructions. As an illustrative example, the system may store an indication that the entity has accessed the given resource (e.g., line of credit, such as a BNPL loan), as well as an indication of the access configuration used for this resource. By doing so, the system may generate more accurate determinations of user permissions (e.g., permission for a customer to access given BNPL loans) based on previous resources provided to the user.

In some embodiments, the system may receive updated configuration parameters for access configurations and update access to the resources by the first entity accordingly. For example, the system may receive, from a second entity, an updated configuration parameter set corresponding to the first access configuration. The system may provide access to the first resource for the first entity according to the updated configuration parameter set for the first access configuration. As an illustrative example, a second entity (e.g., an administrator system) may determine that terms for a given BNPL loan that were chosen by the first entity (e.g., a customer of a merchant) are unfavorable and, as such, update the terms accordingly. By doing so, the system improves administrator (e.g., merchant or lender) control over resources provided to the first entity.

In some embodiments, the system may provide access to the first access configuration, as selected by the first entity, if the sum of resource values of previously requested resources is below a threshold. For example, the system may determine a first resource value based on the first resource parameter set, wherein the first resource value indicates a first quantitative measure of the first resource. The system may determine an entity identifier corresponding to the first entity based on the first resource access request. The system may retrieve, from a resource access database, a plurality of requested resources associated with the first entity, wherein the plurality of requested resources includes previously requested resources requested by the first entity. The system may determine a plurality of resource values, wherein each resource value of the plurality of resource values indicates a corresponding quantitative measure of a corresponding previously requested resource. The system may generate a sum value of the first resource value and each resource value in the plurality of resource values and the first resource. The system may compare the sum value with a threshold value associated with a first configuration parameter associated with the first access configuration. Based on comparing the sum value with the threshold value, the system may determine to provide, to the device, access to the first resource according to the first access configuration. For example, the system may determine that because only a small monetary value of lines of credit has been previously requested from the first entity (e.g., below a threshold monetary value), the first access configuration (e.g., a BNPL loan) is compatible for provision of the requested line of credit. In some embodiments, the system may determine that the sum value (e.g., a sum monetary value of previously requested lines of credit) is greater than the threshold value; in these cases, the system may determine a second access configuration of the set of access configurations, as agreed upon by both the first entity and the second entity. For example, the second access configuration may have different configuration parameters, such as a higher interest rate or shorter loan duration, to mitigate financial risk. As such, the system enables compromise between administrator systems (e.g., merchants or lenders) and users (e.g., customers) by providing access to resources according to the set of access configurations.

In some embodiments, the system may modify the configuration criteria based on the first entity's access history. For example, the system may retrieve, from a resource access database, an access history for the first entity, wherein the access history includes information relating to previously accessed resources associated with the first entity. The system may generate an updated configuration criteria based on the access history. The system may transmit, to the device, a third request for a plurality of configuration parameter sets. The system may receive, from the device, an updated plurality of configuration parameter sets, wherein the respective configuration parameter set of the updated plurality of configuration parameter sets satisfies the respective specification of the updated configuration criteria. As an illustrative example, the system may determine different ranges (e.g., upper or lower bounds or first and second requirements) for parameters within the configuration parameter sets, as defined in corresponding specifications of the configuration criteria, based on the first entity's previous access history. For example, the system may determine that, due to evidence of a customer borrowing excessively, the interest rates and loan durations allowed for a given access configuration are greater than for a customer borrowing less. As such, the system may alter the configuration criteria to provide the customer with a different set of restrictions within specifications associated with access configurations. By doing so, the system may mitigate financial risk or cloud storage system risk accordingly.

In some embodiments, the system may alter access configurations accessible to the first entity based on any changes in requested resources over time. For example, the system may determine, based on the access history, a first sum of resource values associated with the previously accessed resources, wherein the first sum of resource values is associated with a first time period of a first length. The system may determine, based on the access history, a second sum of resource values associated with the previously accessed resources, wherein the second sum is associated with a second time period of the first length, wherein the first time period and the second time period are distinct. The system may compare the first sum and the second sum. Based on determining that a difference between the first sum and the second sum is greater than a threshold difference associated with a second configuration parameter set associated with a second access configuration, the system may determine that the second access configuration is inaccessible to the first entity. For example, the system may determine that there has been a large difference in spending between a first time period and a second time period, where this spending reflects purchases or transactions for which lines of credit were previously requested. Based on determining this difference in the sum (e.g., total monetary value) of these transactions or purchases between the two time periods, the system may determine to prohibit access to particular access configurations (e.g., BNPL loans) in order to mitigate financial risk (e.g., a risk of default on a payment).

In some embodiments, the system may receive another resource access request and determine that this resource access request is consistent with another access configuration of the set of access configurations. For example, the system may receive a second resource access request from the device, the second resource access request comprising a second resource parameter set corresponding to a second resource. The system may compare parameters of the second resource access request with each configuration parameter set of the plurality of configuration parameter sets. Based on comparing the parameters of the second resource access request with each configuration parameter set of the plurality of configuration parameter sets, the system may determine that the first access configuration is consistent with the second resource. The system may provide, to the device, access to the second resource according to the first access configuration. As an illustrative example, the system may receive an indication of another payment or transaction for which a customer of a merchant requests a line of credit. Based on comparing resource parameters for this second payment or transaction (e.g., monetary values or purchase types) with parameters corresponding to configuration parameter sets of the set of access configurations, such as maximum monetary values (e.g., maximum sums) or resource types associated with the access configurations, the system may determine that the first access configuration (e.g., a BNPL loan) is also compatible with the second resource based on the first configuration parameter set.

In some embodiments, this compatible access configuration may include an access configuration distinct from the first access configuration. For example, the system may receive a second resource access request from the device, the second resource access request comprising a second resource parameter set corresponding to a second resource. The system may compare parameters of the second resource access request with each configuration parameter set of the plurality of configuration parameter sets. Based on comparing the parameters of the second resource access request with each configuration parameter set of the plurality of configuration parameter sets, the system may determine a second access configuration of the set of access configurations, wherein the second access configuration is consistent with the second resource and wherein the second access configuration is distinct from the first access configuration. The system may provide, to the device, access to the second resource according to the second access configuration. For example, the system may select a second BNPL loan of the set of access configurations, where this second BNPL loan is compatible with parameters associated with a second purchase or transaction for which a line of credit is desired. Accordingly, the system enables dynamic handling of subsequent resource access requests on the basis of both specifications (e.g., as specified by merchants or lenders) and user preference (e.g., as specified by the received plurality of configuration parameter sets from the device associated with a customer).

In some embodiments, the system may determine that a sum of values associated with the first resource and the second resource is greater than a threshold value associated with the first access configuration and provide a second access configuration for the first and second resources accordingly. For example, the system may receive a second resource access request from the device, the second resource access request comprising a second resource parameter set corresponding to a second resource. The system may determine a first resource value based on the first resource parameter set, wherein the first resource value indicates a first quantitative measure of the first resource. The system may determine a second resource value based on the second resource parameter set, wherein the second resource value indicates a second quantitative measure of the second resource. The system may determine an entity identifier corresponding to the first entity based on the first resource access request. The system may generate a sum value of the first resource value and the second resource value. The system may compare the sum value with a threshold value associated with a first configuration parameter associated with the first access configuration. Based on comparing the sum value with the threshold value, the system may determine to provide, to the device, access to the first resource according to a second access configuration distinct from the first access configuration. As an illustrative example, the system may determine that the sum of values associated with two transactions (e.g., two purchases) is greater than a threshold value for a first BNPL loan. Based on this determination, the system may select a second BNPL loan or line of credit distinct from the first, thereby enabling selection of a compatible access configuration. By doing so, the system may mitigate financial risk associated with providing larger lines of credit to users by selecting a different type of loan with different parameters.

It is contemplated that the steps or descriptions of FIGS. 4 and 5 may be used with any other embodiment of this disclosure. In addition, the steps and descriptions described in relation to FIGS. 4 and 5 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIGS. 4 and 5.

The above-described embodiments of the present disclosure are presented for purposes of illustration and not of limitation, and the present disclosure is limited only by the claims that follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

A1. A method, the method comprising receiving a resource access request from a user, the resource access request comprising a first resource parameter set corresponding to a first resource requested by the user; retrieving a plurality of resource groupings, wherein each resource grouping of the plurality of resource groupings includes a corresponding grouping class and a corresponding grouping parameter set; determining a first grouping of the plurality of resource groupings for the first resource based on the first resource parameter set, wherein the first grouping is associated with a first grouping parameter set; transmitting, to an administrator system, a first request for a set of allowed access configurations, wherein the first request comprises the first grouping parameter set; in response to the first request, receiving, from the administrator system, a set of access configurations, wherein each access configuration of the set of access configurations is associated with an associated configuration parameter set, wherein each configuration parameter set indicates a protocol for accessing resources based on an associated access configuration, and wherein a corresponding configuration parameter of the associated configuration parameter set matches a corresponding resource parameter of the first grouping parameter set; transmitting a second request to the user for an access protocol for providing the first resource, wherein the second request to the user comprises an indication of the set of access configurations; receiving, from the user, a requested access configuration of the set of access configurations for accessing the first resource; and providing access to the first resource for the user according to the requested access configuration.

A2. A method, the method comprising receiving a resource access request from a first entity, the resource access request comprising a first resource parameter set corresponding to a first resource requested by the first entity; retrieving a plurality of resource groupings, wherein each resource grouping of the plurality of resource groupings includes a corresponding grouping class and a corresponding grouping parameter set; determining a first grouping of the plurality of resource groupings for the first resource based on the first resource parameter set, wherein the first grouping is associated with a first grouping parameter set; obtaining, from a second entity, a set of access configurations based on the first grouping parameter set, wherein each access configuration of the set of access configurations is associated with an associated configuration parameter set, wherein each configuration parameter set indicates a protocol for an associated access configuration, and wherein a corresponding configuration parameter of the associated configuration parameter set matches a corresponding resource parameter of the first grouping parameter set; receiving, from the first entity, a requested access configuration of the set of access configurations for accessing the first resource; and providing access to the first resource for the first entity according to the requested access configuration and the associated configuration parameter set.

A3. A method, the method comprising receiving a resource access request from a first user, the resource access request comprising a first resource parameter set corresponding to a first resource requested by the first user; retrieving a plurality of resource groupings, wherein each resource grouping of the plurality of resource groupings includes a corresponding grouping class and a corresponding grouping parameter set; determining a first grouping of the plurality of resource groupings for the first resource based on the first resource parameter set, wherein the first grouping is associated with a first grouping parameter set; transmitting, to a server system, a first request for a set of allowed access configurations, wherein the first request comprises the first grouping parameter set; based on the first request, obtaining, from the server system, a set of access configurations, wherein each access configuration of the set of access configurations is associated with an associated configuration parameter set, wherein each configuration parameter set corresponds to an associated access configuration, and wherein a corresponding configuration parameter of the associated configuration parameter set matches a corresponding resource parameter of the first grouping parameter set; and providing access to the first resource for the first user according to a requested access configuration and the associated configuration parameter set, the requested access configuration received from the first user.

A4. The method of any one of the preceding embodiments, wherein determining the first grouping based on the first resource parameter set comprises: determining a first resource type for the first resource from a first parameter of the first resource parameter set; obtaining a first plurality of resources associated with the first grouping and a corresponding plurality of resource parameter sets, wherein each resource parameter set is associated with an associated resource of the first plurality of resources; determining that each resource parameter set of the corresponding plurality of resource parameter sets includes an associated resource parameter, wherein the associated resource parameter corresponds to the first resource type for the first resource; and based on determining that each resource parameter set includes the associated resource parameter, generating the first grouping to include the first plurality of resources.

A5. The method of any one of the preceding embodiments, wherein determining the first grouping based on the first resource parameter set comprises: determining a first resource value based on the first resource parameter set, wherein the first resource value indicates a first quantitative measure of the first resource; determining an entity identifier corresponding to the first entity based on the resource access request; retrieving, from a resource access database, a plurality of requested resources associated with the first entity, wherein the plurality of requested resources includes previously requested resources requested by the first entity; determining a plurality of resource values, wherein each resource value of the plurality of resource values indicates a corresponding quantitative measure of a corresponding previously requested resource; generating a sum value of the first resource value and each resource value in the plurality of resource values and the first resource; comparing the sum value with a threshold value associated with the first grouping; and based on comparing the sum value with the threshold value associated with the first grouping, determining the first grouping to include the plurality of requested resources and the first resource.

A6. The method of any one of the preceding embodiments, wherein determining the first grouping based on the first resource parameter set comprises: determining a first timestamp based on the first resource parameter set, wherein the first timestamp indicates a time associated with requesting the first resource; determining one or more timestamps associated with the first grouping based on the first grouping parameter set, wherein the one or more timestamps indicate a time period associated with resources within the first grouping; and based on comparing the first timestamp with the one or more timestamps, determining the first grouping to include the first resource.

A7. The method of any one of the preceding embodiments, wherein obtaining the set of access configurations comprises: receiving, from the second entity, a plurality of available access configurations; determining a first entity evaluation metric for the first entity, the first entity evaluation metric indicating a degree of trustworthiness for the first entity; retrieving a threshold evaluation metric associated with a first access configuration of the plurality of available access configurations; comparing the first entity evaluation metric with the threshold evaluation metric; and based on determining that the first entity evaluation metric is greater than the threshold evaluation metric, generating the set of access configurations to include the first access configuration.

A8. The method of any one of the preceding embodiments, wherein determining the first entity evaluation metric comprises: determining an entity identifier corresponding to the first entity based on the resource access request; transmitting an entity evaluation request to a server system, wherein the entity evaluation request comprises the entity identifier and a request for an evaluation of the first entity; and in response to transmitting the entity evaluation request, receiving the first entity evaluation metric from the server system.

A9. The method of any one of the preceding embodiments, further comprising: generating an updated set of access configurations based on the first entity evaluation metric, wherein each access configuration of the updated set of access configurations is associated with a corresponding updated configuration parameter set; and transmitting a second request to the first entity for an access protocol for providing the first resource, wherein the second request comprises an indication of the set of access configurations, wherein the second request includes an indication of the updated set of access configurations; and receiving the requested access configuration in response to the second request.

A10. The method of any one of the preceding embodiments, further comprising: retrieving a first plurality of resources associated with the first grouping; based on the first plurality of resources, determining a sum value for the first grouping, wherein the sum value indicates a sum of a plurality of resource values associated with the first plurality of resources; based on retrieving a plurality of timestamps corresponding to the first plurality of resources, determining an indication of a period of time associated with the first plurality of resources; and generating the first grouping parameter set, the first grouping parameter set comprising the sum value and the indication of the period of time as corresponding grouping parameters.

A11. The method of any one of the preceding embodiments, wherein obtaining the set of access configurations comprises: receiving a plurality of available access configurations from the second entity, wherein each available access configuration of the plurality of available access configurations is associated with an associated available configuration parameter set of a plurality of available configuration parameter sets; comparing one or more grouping parameters of the first grouping parameter set with one or more respective parameters of each available configuration parameter set of the plurality of available configuration parameter sets; and based on determining that the one or more grouping parameters match the one or more respective parameters, determining the set of access configurations from the plurality of available access configurations.

A12. The method of any one of the preceding embodiments, wherein determining that the one or more grouping parameters match the one or more respective parameters comprises: determining a sum value parameter from the first grouping parameter set; determining a plurality of maximum value parameters, wherein each maximum value parameter of the plurality of maximum value parameters is associated with the associated available configuration parameter set; and based on determining that the sum value parameter is less than each maximum value parameter of a subset of the plurality of maximum value parameters, determining the set of access configurations to include a subset of access configurations, wherein each access configuration of the subset of access configurations is associated with a corresponding maximum value parameter of the subset of the plurality of maximum value parameters.

A13. The method of any one of the preceding embodiments, wherein providing access to the first resource for the first entity according to the requested access configuration comprises: determining, based on the first resource parameter set, a plurality of resource access instructions for accessing the first resource; and transmitting, to the first entity, the plurality of resource access instructions.

A14. The method of any one of the preceding embodiments, further comprising: determining a first time, wherein the first time indicates a time at which the first entity accesses the first resource; generating, at a second time, an indication of whether the first entity has executed each instruction of the plurality of resource access instructions, wherein the second time is greater than a threshold elapsed time from the first time; and based on the indication of whether the first entity has executed each instruction of the plurality of resource access instructions, transmitting a warning message to the first entity, wherein the warning message indicates a subset of instructions of the plurality of resource access instructions for the first entity to execute.

A15. The method of any one of the preceding embodiments, further comprising: retrieving, from a resource access database, an entity access history for the first entity, wherein the entity access history includes information relating to previously accessed resources associated with the first entity; and updating the entity access history to include the indication of whether the first entity has executed each instruction of the plurality of resource access instructions.

A16. The method of any one of the preceding embodiments, further comprising: receiving, from a third entity, an updated configuration parameter set corresponding to the requested access configuration of the set of access configurations; and providing access to the first resource for the first entity according to the updated configuration parameter set.

A17. The method of any one of the preceding embodiments, further comprising: receiving, from the first entity, a requested configuration parameter set corresponding to the requested access configuration; transmitting an authorization request to the second entity, the authorization request comprising the requested configuration parameter set; receiving an authorization indication from the second entity; and based on receiving the authorization indication from the second entity, modifying the requested access configuration and the associated configuration parameter set to include the requested configuration parameter set.

A18. One or more non-transitory, computer-readable media storing instructions that, when executed by a data processing apparatus, cause the data processing apparatus to perform operations comprising those of any of embodiments A1-A17.

A19. A system comprising one or more processors; and memory storing instructions that, when executed by the processors, cause the one or more processors to effectuate operations comprising those of any of embodiments A1-A17.

A20. A system comprising means for performing any of embodiments A1-A17.

A21. A system comprising cloud-based circuitry for performing any of embodiments A1-A17.

B1. A method, the method comprising receiving a resource access request from a user device, the resource access request comprising a first resource parameter set corresponding to a first resource requested by the user device; transmitting, to an administrator system, a first request for configuration criteria, wherein the configuration criteria comprises a set of specifications, wherein each specification of the set of specifications indicates requirements for a corresponding configuration parameter set for a corresponding access configuration of a set of access configurations, and wherein the corresponding configuration parameter set indicates a protocol for accessing resources based on the corresponding access configuration; in response to receiving, from the administrator system, the configuration criteria, transmitting, to the user device, a second request for a plurality of configuration parameter sets; receiving, from the user device, the plurality of configuration parameter sets, wherein a respective configuration parameter set of the plurality of configuration parameter set of the plurality of configuration parameter sets satisfies a respective specification of the configuration criteria; based on comparing parameters of the first resource parameter set with each configuration parameter set of the plurality of configuration parameter sets, determining a first access configuration of the set of access configurations, wherein the first access configuration is consistent with the first resource requested by the user device; and providing, to the user device, access to the first resource according to the first access configuration.

B2. A method, the method comprising receiving a first resource access request from a device associated with a first entity, the first resource access request comprising a first resource parameter set corresponding to a first resource; transmitting, to a first system, a first request for configuration criteria, wherein the configuration criteria comprises a set of specifications, wherein each specification of the set of specifications is associated with a corresponding configuration parameter set for a corresponding access configuration of a set of access configurations, and wherein the corresponding configuration parameter set controls access to resources based on the corresponding access configuration; receiving, from the device, a plurality of configuration parameter sets, wherein a respective configuration parameter set of the plurality of configuration parameter sets satisfies a respective specification of the configuration criteria; determining a first access configuration of the set of access configurations, wherein parameters of the first resource parameter set are consistent with the first access configuration; and providing, to the device, access to the first resource according to the first access configuration.

B3. A method, the method comprising: receiving a first resource access request from a user device, the first resource access request comprising a first resource parameter set corresponding to a first resource; obtaining, from a first system, configuration criteria, wherein the configuration criteria comprises a set of specifications, wherein each specification of the set of specifications indicates requirements for a corresponding configuration parameter set for a corresponding access configuration of a set of access configurations, and wherein the corresponding configuration parameter set indicates a protocol for accessing resources based on the corresponding access configuration; in response to obtaining the configuration criteria from the first system, transmitting, to the user device, a second request for a plurality of configuration parameter sets; receiving, from the user device, the plurality of configuration parameter sets, wherein a respective configuration parameter set of the plurality of configuration parameter sets satisfies a respective specification of the configuration criteria; comparing parameters of the first resource parameter set with each configuration parameter set of the plurality of configuration parameter sets; based on comparing the parameters, determining a first access configuration of the set of access configurations, wherein the first access configuration is consistent with the parameters; and providing, to the user device, access to the first resource according to the first access configuration.

B4. The method of any one of the preceding embodiments, further comprising: receiving a first requirement for a first configuration parameter of a first configuration parameter set corresponding to the first access configuration of the set of access configurations, wherein the first requirement includes an upper bound on the first configuration parameter; receiving a second requirement for the first configuration parameter of the first configuration parameter set, wherein the second requirement includes a lower bound on the first configuration parameter; and generating the configuration criteria to include a first specification for the first access configuration, wherein the first specification includes the first requirement and the second requirement.

B5. The method of any one of the preceding embodiments, further comprising: determining a first parameter of a first parameter set of the plurality of configuration parameter sets received from the device, wherein the first parameter corresponds to the first configuration parameter of the first access configuration, and wherein the first parameter set corresponds to the first access configuration; comparing the first parameter with the first requirement and the second requirement; and based on determining that the first parameter is greater than or equal to the first requirement and less than or equal to the second requirement, determining that the first parameter set satisfies the first specification of the first access configuration.

B6. The method of any one of the preceding embodiments, wherein determining the first access configuration of the set of access configurations comprises: determining a first resource type based on the first resource parameter set; determining a second resource type based on a first configuration parameter set corresponding to the first access configuration; and determining that the first resource type corresponds to the second resource type.

B7. The method of any one of the preceding embodiments, wherein providing, to the device, access to the first resource according to the first access configuration comprises: determining, based on the first resource parameter set, a plurality of resource access instructions for accessing the first resource; and transmitting, to the device, the plurality of resource access instructions.

B8. The method of any one of the preceding embodiments, further comprising: determining a first time, wherein the first time indicates a time at which the device accesses the first resource; generating, at a second time, an indication of whether the device has executed each instruction of the plurality of resource access instructions, wherein the second time is greater than a threshold elapsed time from the first time; and based on the indication of whether the device has executed each instruction of the plurality of resource access instructions, transmitting a warning message to the device, wherein the warning message indicates a subset of instructions of the plurality of resource access instructions for the first entity to execute.

B9. The method of any one of the preceding embodiments, further comprising: retrieving, from a resource access database, an access history for the first entity, wherein the access history includes information relating to previously accessed resources associated with the first entity; and updating the access history to include the indication of whether the first entity has executed each instruction of the plurality of resource access instructions.

B10. The method of any one of the preceding embodiments, further comprising: receiving, from a second entity, an updated configuration parameter set corresponding to the first access configuration; and providing access to the first resource for the first entity according to the updated configuration parameter set for the first access configuration.

B11. The method of any one of the preceding embodiments, wherein providing, to the device, access to the first resource according to the first access configuration comprises: determining a first resource value based on the first resource parameter set, wherein the first resource value indicates a first quantitative measure of the first resource; determining an entity identifier corresponding to the first entity based on the first resource access request; retrieving, from a resource access database, a plurality of requested resources associated with the first entity, wherein the plurality of requested resources includes previously requested resources requested by the first entity; determining a plurality of resource values, wherein each resource value of the plurality of resource values indicates a corresponding quantitative measure of a corresponding previously requested resource; generating a sum value of the first resource value and each resource value in the plurality of resource values and the first resource; comparing the sum value with a threshold value associated with a first configuration parameter associated with the first access configuration; and based on comparing the sum value with the threshold value, determining to provide, to the device, access to the first resource according to the first access configuration.

B12. The method of any one of the preceding embodiments, further comprising: retrieving, from a resource access database, an access history for the first entity, wherein the access history includes information relating to previously accessed resources associated with the first entity; generating an updated configuration criteria based on the access history; transmitting, to the device, a third request for a plurality of configuration parameter sets; and receiving, from the device, an updated plurality of configuration parameter sets, wherein the respective configuration parameter set of the updated plurality of configuration parameter sets satisfies the respective specification of the updated configuration criteria.

B13. The method of any one of the preceding embodiments, further comprising: determining, based on the access history, a first sum of resource values associated with the previously accessed resources, wherein the first sum of resource values is associated with a first time period of a first length; determining, based on the access history, a second sum of resource values associated with the previously accessed resources, wherein the second sum is associated with a second time period of the first length, wherein the first time period and the second time period are distinct; comparing the first sum and the second sum; and based on determining that a difference between the first sum and the second sum is greater than a threshold difference associated with a second configuration parameter set associated with a second access configuration, determining that the second access configuration is inaccessible to the first entity.

B14. The method of any one of the preceding embodiments, further comprising: receiving a second resource access request from the device, the second resource access request comprising a second resource parameter set corresponding to a second resource; comparing parameters of the second resource access request with each configuration parameter set of the plurality of configuration parameter sets; based on comparing the parameters of the second resource access request with each configuration parameter set of the plurality of configuration parameter sets, determining that the first access configuration is consistent with the second resource; and providing, to the device, access to the second resource according to the first access configuration.

B15. The method of any one of the preceding embodiments, further comprising: receiving a second resource access request from the device, the second resource access request comprising a second resource parameter set corresponding to a second resource; comparing parameters of the second resource access request with each configuration parameter set of the plurality of configuration parameter sets; based on comparing the parameters of the second resource access request with each configuration parameter set of the plurality of configuration parameter sets, determining a second access configuration of the set of access configurations, wherein the second access configuration is consistent with the second resource, and wherein the second access configuration is distinct from the first access configuration; and providing, to the device, access to the second resource according to the second access configuration.

B16. The method of any one of the preceding embodiments, further comprising: receiving a second resource access request from the device, the second resource access request comprising a second resource parameter set corresponding to a second resource; determining a first resource value based on the first resource parameter set, wherein the first resource value indicates a first quantitative measure of the first resource; determining a second resource value based on the second resource parameter set, wherein the second resource value indicates a second quantitative measure of the second resource; determining an entity identifier corresponding to the first entity based on the first resource access request; generating a sum value of the first resource value and the second resource value; comparing the sum value with a threshold value associated with a first configuration parameter associated with the first access configuration; and based on comparing the sum value with the threshold value, determining to provide, to the device, access to the first resource according to a second access configuration distinct from the first access configuration.

B17. One or more non-transitory, computer-readable media storing instructions that, when executed by a data processing apparatus, cause the data processing apparatus to perform operations comprising those of any of embodiments B1-B16.

B18. A system comprising one or more processors; and memory storing instructions that, when executed by the processors, cause the one or more processors to effectuate operations comprising those of any of embodiments B1-B16.

B19. A system comprising means for performing any of embodiments B1-B16.

B20. A system comprising cloud-based circuitry for performing any of embodiments B1-B16.

What is claimed is:

1. A system for dynamically mediating user access to resources based on user and administrator system input, the system comprising:

one or more processors; and one or more non-transitory, computer-readable media storing instructions that, when executed by the one or more processors, cause operations comprising:

receiving a resource access request from a user device, the resource access request comprising a first resource parameter set corresponding to a first resource requested by the user device;

transmitting, to an administrator system, a first request for configuration criteria, wherein the configuration criteria comprises a set of specifications, wherein each specification of the set of specifications indicates requirements for a corresponding configuration parameter set for a corresponding access configuration of a set of access configurations, and wherein the corresponding configuration parameter set indicates a protocol for accessing resources based on the corresponding access configuration;

in response to receiving, from the administrator system, the configuration criteria, transmitting, to the user device, a second request for a plurality of configuration parameter sets;

receiving, from the user device, the plurality of configuration parameter sets, wherein a respective configuration parameter set of the plurality of configuration parameter sets satisfies a respective specification of the configuration criteria;

based on comparing parameters and resource values of the first resource parameter set with each configuration parameter set of the plurality of configuration parameter sets, determining a first access configuration of the set of access configurations, wherein the first access configuration is consistent with the first resource requested by the user device;

receiving, from a resource access database, an access history for the user device, wherein the access history includes information relating to previously accessed resources associated with the user device;

generating an updated configuration criteria based on the access history;

receiving, from the user device, an updated plurality of configuration parameter sets, wherein the respective configuration parameter set of the updated plurality of configuration parameter sets satisfies the respective specification of the updated configuration criteria;

determining, based on the access history, a first sum of resource values associated with the previously accessed resources, wherein the first sum of resource values is associated with a first time period of a first length;

determining, based on the access history, a second sum of resource values associated with the previously accessed resources, wherein the second sum is associated with a second time period of the first length, and wherein the first time period and the second time period are distinct;

comparing the first sum and the second sum;

based on determining that a difference between the first sum and the second sum is less than a threshold difference associated with a second configuration parameter set associated with a second access configuration, determining that the second access configuration is accessible to the user device; and providing, based on determining that the second access configuration is accessible to the user device, to the user device, access to the first resource according to the first access configuration.

2. A method for dynamically mediating access to resources comprising:

receiving a first resource access request from a device associated with a first entity, the first resource access request comprising a first resource parameter set corresponding to a first resource;

transmitting, to a first system, a first request for configuration criteria, wherein the configuration criteria comprises a set of specifications, wherein each specification of the set of specifications is associated with a corresponding configuration parameter set for a corresponding access configuration of a set of access configurations, and wherein the corresponding configuration parameter set controls access to resources based on the corresponding access configuration;

receiving, from the device, a plurality of configuration parameter sets, wherein a first configuration parameter set of the plurality of configuration parameter sets satisfies a respective specification of the configuration criteria;

determining a first access configuration of the set of access configurations, wherein parameters of the first resource parameter set are consistent with the first access configuration;

determining, based on an access history for the device, a first sum of resource values associated with previously accessed resources, wherein the first sum of resource values is associated with a first time period of a first length;

determining, based on the access history, a second sum of resource values associated with the previously accessed resources, wherein the second sum is associated with a second time period of the first length;

determining, based on the first sum, the second sum, and a second configuration parameter set associated with a second access configuration of the set of access configurations, that the second access configuration is accessible to the device; and providing, based on determining that the second access configuration is accessible to the device, to the device, access to the first resource according to the first access configuration.

3. The method of claim 2, further comprising:

receiving a first requirement for a first configuration parameter of the first configuration parameter set corresponding to the first access configuration of the set of access configurations, wherein the first requirement includes an upper bound on the first configuration parameter;

receiving a second requirement for the first configuration parameter of the first configuration parameter set, wherein the second requirement includes a lower bound on the first configuration parameter; and generating the configuration criteria to include a first specification for the first access configuration, wherein the first specification includes the first requirement and the second requirement.

4. The method of claim 3, further comprising:

determining a first parameter of a first parameter set of the plurality of configuration parameter sets received from the device, wherein the first parameter corresponds to the first configuration parameter of the first access configuration, and wherein the first parameter set corresponds to the first access configuration;

comparing the first parameter with the first requirement and the second requirement; and based on determining that the first parameter is greater than or equal to the first requirement and less than or equal to the second requirement, determining that the first parameter set satisfies the first specification of the first access configuration.

5. The method of claim 2, wherein determining the first access configuration of the set of access configurations comprises:

determining a first resource type based on the first resource parameter set;

determining a second resource type based on the first configuration parameter set corresponding to the first access configuration; and determining that the first resource type corresponds to the second resource type.

6. The method of claim 2, wherein providing, to the device, access to the first resource according to the first access configuration comprises:

determining, based on the first resource parameter set, a plurality of resource access instructions for accessing the first resource; and transmitting, to the device, the plurality of resource access instructions.

7. The method of claim 6, further comprising:

determining a first time, wherein the first time indicates a time at which the device accesses the first resource;

generating, at a second time, an indication of whether the device has executed each instruction of the plurality of resource access instructions, wherein the second time is greater than a threshold elapsed time from the first time; and based on the indication of whether the device has executed each instruction of the plurality of resource access instructions, transmitting a warning message to the device, wherein the warning message indicates a subset of instructions of the plurality of resource access instructions for the first entity to execute.

8. The method of claim 7, further comprising:

retrieving, from a resource access database, an access history for the first entity, wherein the access history for the first entity includes information relating to previously accessed resources associated with the first entity; and updating the access history for the first entity to include the indication of whether the first entity has executed each instruction of the plurality of resource access instructions.

9. The method of claim 2, further comprising:

receiving, from a second entity, an updated configuration parameter set corresponding to the first access configuration; and providing access to the first resource for the first entity according to the updated configuration parameter set for the first access configuration.

10. The method of claim 2, wherein providing, to the device, access to the first resource according to the first access configuration comprises:

determining a first resource value based on the first resource parameter set, wherein the first resource value indicates a first quantitative measure of the first resource;

determining an entity identifier corresponding to the first entity based on the first resource access request;

retrieving, from a resource access database, a plurality of requested resources associated with the first entity, wherein the plurality of requested resources includes previously requested resources requested by the first entity;

determining a plurality of resource values, wherein each resource value of the plurality of resource values indicates a corresponding quantitative measure of a corresponding previously requested resource;

generating a sum value of the first resource value and each resource value in the plurality of resource values and the first resource;

comparing the sum value with a threshold value associated with a first configuration parameter associated with the first access configuration; and based on comparing the sum value with the threshold value, determining to provide, to the device, access to the first resource according to the first access configuration.

11. The method of claim 2, further comprising:

retrieving, from a resource access database, an access history for the first entity, wherein the access history for the first entity includes information relating to previously accessed resources associated with the first entity;

generating an updated configuration criteria based on the access history for the first entity;

transmitting, to the device, a third request for the plurality of configuration parameter sets; and receiving, from the device, an updated plurality of configuration parameter sets, wherein the respective configuration parameter set of the updated plurality of configuration parameter sets satisfies the respective specification of the updated configuration criteria.

12. The method of claim 11, wherein determining that the second access configuration is accessible to the device comprises:

determining, based on the access history, the second sum of resource values associated with the previously accessed resources, wherein the second sum is associated with the second time period of the first length, and wherein the first time period and the second time period are distinct; and based on determining that a difference between the first sum and the second sum is greater than a threshold difference associated with the second configuration parameter set associated with the second access configuration, determining that the second access configuration is inaccessible to the first entity, wherein the first time period and the second time period are distinct.

13. The method of claim 2, further comprising:

receiving a second resource access request from the device, the second resource access request comprising a second resource parameter set corresponding to a second resource;

comparing parameters of the second resource access request with each configuration parameter set of the plurality of configuration parameter sets;

based on comparing the parameters of the second resource access request with each configuration parameter set of the plurality of configuration parameter sets, determining that the first access configuration is consistent with the second resource; and providing, to the device, access to the second resource according to the first access configuration.

14. The method of claim 2, further comprising:

receiving a second resource access request from the device, the second resource access request comprising a second resource parameter set corresponding to a second resource;

comparing parameters of the second resource access request with each configuration parameter set of the plurality of configuration parameter sets;

based on comparing the parameters of the second resource access request with each configuration parameter set of the plurality of configuration parameter sets, determining the second access configuration of the set of access configurations, wherein the second access configuration is consistent with the second resource, and wherein the second access configuration is distinct from the first access configuration; and providing, to the device, access to the second resource according to the second access configuration.

15. The method of claim 2, further comprising:

receiving a second resource access request from the device, the second resource access request comprising a second resource parameter set corresponding to a second resource;

determining a first resource value based on the first resource parameter set, wherein the first resource value indicates a first quantitative measure of the first resource;

determining a second resource value based on the second resource parameter set, wherein the second resource value indicates a second quantitative measure of the second resource;

generating a sum value of the first resource value and the second resource value;

comparing the sum value with a threshold value associated with a first configuration parameter associated with the first access configuration; and based on comparing the sum value with the threshold value, determining to provide, to the device, access to the first resource according to the second access configuration distinct from the first access configuration.

16. One or more non-transitory, computer-readable media for dynamically mediating access to resources storing instructions that, when executed by one or more processors, cause operations comprising:

receiving a first resource access request from a user device, the first resource access request comprising a first resource parameter set corresponding to a first resource;

obtaining, from a first system, configuration criteria, wherein the configuration criteria comprises a set of specifications, wherein each specification of the set of specifications indicates requirements for a corresponding configuration parameter set for a corresponding access configuration of a set of access configurations, and wherein the corresponding configuration parameter set indicates a protocol for accessing resources based on the corresponding access configuration;

in response to obtaining the configuration criteria from the first system, transmitting, to the user device, a second request for a plurality of configuration parameter sets;

receiving, from the user device, the plurality of configuration parameter sets, wherein a respective configuration parameter set of the plurality of configuration parameter sets satisfies a respective specification of the configuration criteria;

comparing parameters of the first resource parameter set with each configuration parameter set of the plurality of configuration parameter sets;

based on comparing the parameters, determining a first access configuration of the set of access configurations, wherein the first access configuration is consistent with the parameters;

determining, based on access history for the user device, a first sum of resource values associated with previously accessed resources, wherein the first sum of resource values is associated with a first time period of a first length;

determining, based on the access history, a second sum of resource values associated with the previously accessed resources, wherein the second sum is associated with a second time period of the first length;

comparing the first sum and the second sum;

based on comparing the first sum and the second sum, determining that a second access configuration is accessible to first user device; and providing, based on determining that the second access configuration is accessible to the device, to the user device, access to the first resource according to the first access configuration.

17. The one or more non-transitory, computer-readable media of claim 16, wherein the instructions cause operations further comprising:

receiving a first requirement for a first configuration parameter of a first configuration parameter set corresponding to the first access configuration of the set of access configurations, wherein the first requirement includes an upper bound on the first configuration parameter;

receiving a second requirement for the first configuration parameter of the first configuration parameter set, wherein the second requirement includes a lower bound on the first configuration parameter; and generating the configuration criteria to include a first specification for the first access configuration, wherein the first specification includes the first requirement and the second requirement.

18. The one or more non-transitory, computer-readable media of claim 17, wherein the instructions cause operations further comprising:

determining a first parameter of a first parameter set of the plurality of configuration parameter sets received from the user device, wherein the first parameter corresponds to the first configuration parameter of the first access configuration, and wherein the first parameter set corresponds to the first access configuration;

comparing the first parameter with the first requirement and the second requirement; and based on determining that the first parameter is greater than or equal to the first requirement and less than or equal to the second requirement, determining that the first parameter set satisfies the first specification of the first access configuration.

19. The one or more non-transitory, computer-readable media of claim 16, wherein the instructions for determining the first access configuration of the set of access configurations cause operations comprising:

determining a first resource type based on the first resource parameter set;

determining a second resource type based on the first configuration parameter set corresponding to the first access configuration; and determining that the first resource type corresponds to the second resource type.

20. The one or more non-transitory, computer-readable media of claim 16, wherein the instructions for providing, to the user device, access to the first resource according to the first access configuration cause operations comprising:

determining, based on the first resource parameter set, a plurality of resource access instructions for accessing the first resource; and transmitting, to the user device, the plurality of resource access instructions.

\* \* \* \* \*